(12) United States Patent
Adachi et al.

(10) Patent No.: US 10,488,507 B2
(45) Date of Patent: Nov. 26, 2019

(54) SURROUNDING ENVIRONMENT ESTIMATION DEVICE AND SURROUNDING ENVIRONMENT ESTIMATING METHOD

(71) Applicant: DENSO IT LABORATORY, INC., Shibuya-ku, Tokyo (JP)

(72) Inventors: Jingo Adachi, Tokyo (JP); Chiharu Yamano, Tokyo (JP)

(73) Assignee: DENSO IT LABORATORY, INC., Tokyo (JP)

( * ) Notice: Subject to any disclaimer, the term of this patent is extended or adjusted under 35 U.S.C. 154(b) by 416 days.

(21) Appl. No.: 15/456,666

(22) Filed: Mar. 13, 2017

(65) Prior Publication Data

US 2017/0269201 A1   Sep. 21, 2017

(30) Foreign Application Priority Data

Mar. 16, 2016  (JP) ................................. 2016-052221

(51) Int. Cl.
  *G01S 13/56* (2006.01)
  *G01S 13/89* (2006.01)
  *G01S 13/93* (2006.01)

(52) U.S. Cl.
  CPC .............. *G01S 13/56* (2013.01); *G01S 13/89* (2013.01); *G01S 13/931* (2013.01)

(58) Field of Classification Search
  CPC ......... G01S 13/56; G01S 13/931; G01S 13/89
  See application file for complete search history.

(56) References Cited

U.S. PATENT DOCUMENTS

| 5,613,039 A | * | 3/1997 | Wang ...................... G01J 3/453 706/24 |
| 5,638,281 A | * | 6/1997 | Wang ...................... G01J 3/453 701/301 |

(Continued)

FOREIGN PATENT DOCUMENTS

| CN | 103176177 B | * 11/2014 |
| JP | 2011-123551 A | 6/2011 |

OTHER PUBLICATIONS

Thrun, Sebastian, Learning Occupancy Grid Maps with Forward Sensor Models, 2003, Kluwer Academic Publishers, Autonomous Robots, 15, pp. 111-127.*

(Continued)

*Primary Examiner* — Mischita L Henson
(74) *Attorney, Agent, or Firm* — Louis Woo

(57) ABSTRACT

A technique of estimating a surrounding environment with higher accuracy from observation data obtained by using sensing equipment is disclosed. According to the technique, a certain pixel in an observation data space which includes the observation data obtained by a sensor 50 is sampled. With regard to the sampled pixel, a grid-unspecified logarithm-likelihood ratio indicating whether a received signal is a signal reflected from a detected object is calculated from an intensity value of the received signal, and a distribution function of an angle indicating the degree of dispersion centering on an azimuth angle is calculated. Then, the product of the grid-unspecified logarithm-likelihood ratio and the distribution function is calculated and thereby a calculation for updating an occupation probability of the object is performed across a plurality of grids in an occupancy grid map by using a value obtained by dispersing the likelihood using the distribution function.

16 Claims, 17 Drawing Sheets

(56) References Cited

U.S. PATENT DOCUMENTS

| | | | | |
|---|---|---|---|---|
| 6,405,132 B1* | 6/2002 | Breed | ................... | B60N 2/002 |
| | | | | 701/301 |
| 2004/0178943 A1* | 9/2004 | Niv | ........................ | G01S 13/50 |
| | | | | 342/29 |
| 2012/0299766 A1* | 11/2012 | Mizutani | ................ | G01S 13/42 |
| | | | | 342/118 |

OTHER PUBLICATIONS

Bernt Schiele, A Comparison of Position Estimation Techniques Using Occupancy Grids, 1994, pp. 1628-1634.*
Lerning Occupancy Grid Maps with Forward Sensor Models, Thrun, S. Autonomous Robots (2003) vol. 15, pp. 111-127.
Optimum Array Processing, Part IV of Detection, Estimation, and Modulation Theory, Van Trees, Harry L., ISBN 0-471-09390-4.
Using Occupancy Grids for Mobile Robot Perception and Navigation, Elfes, Alberto, Carnegie Mellon University, IEEE, Computer Jun. 1989, pp. 46-57.

* cited by examiner

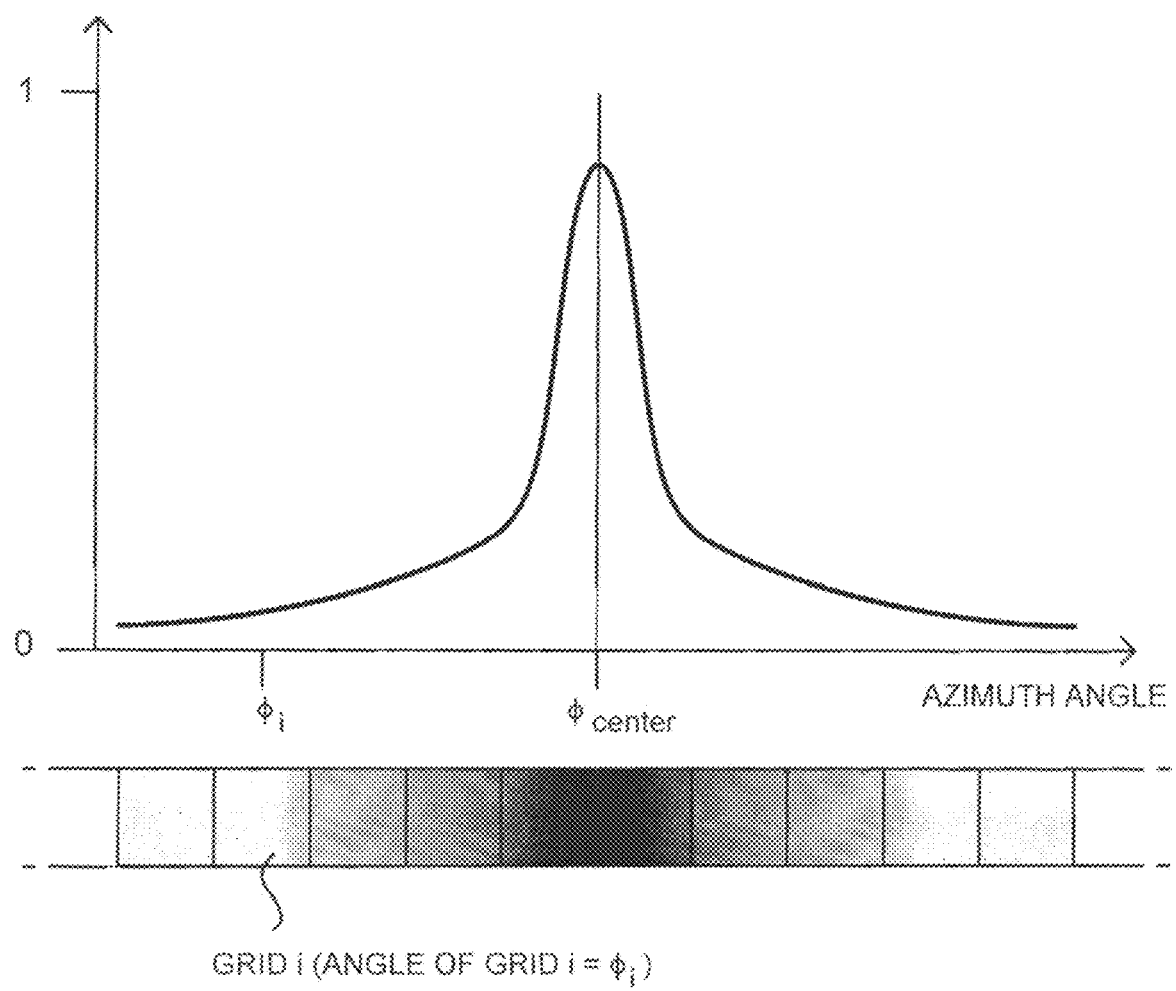

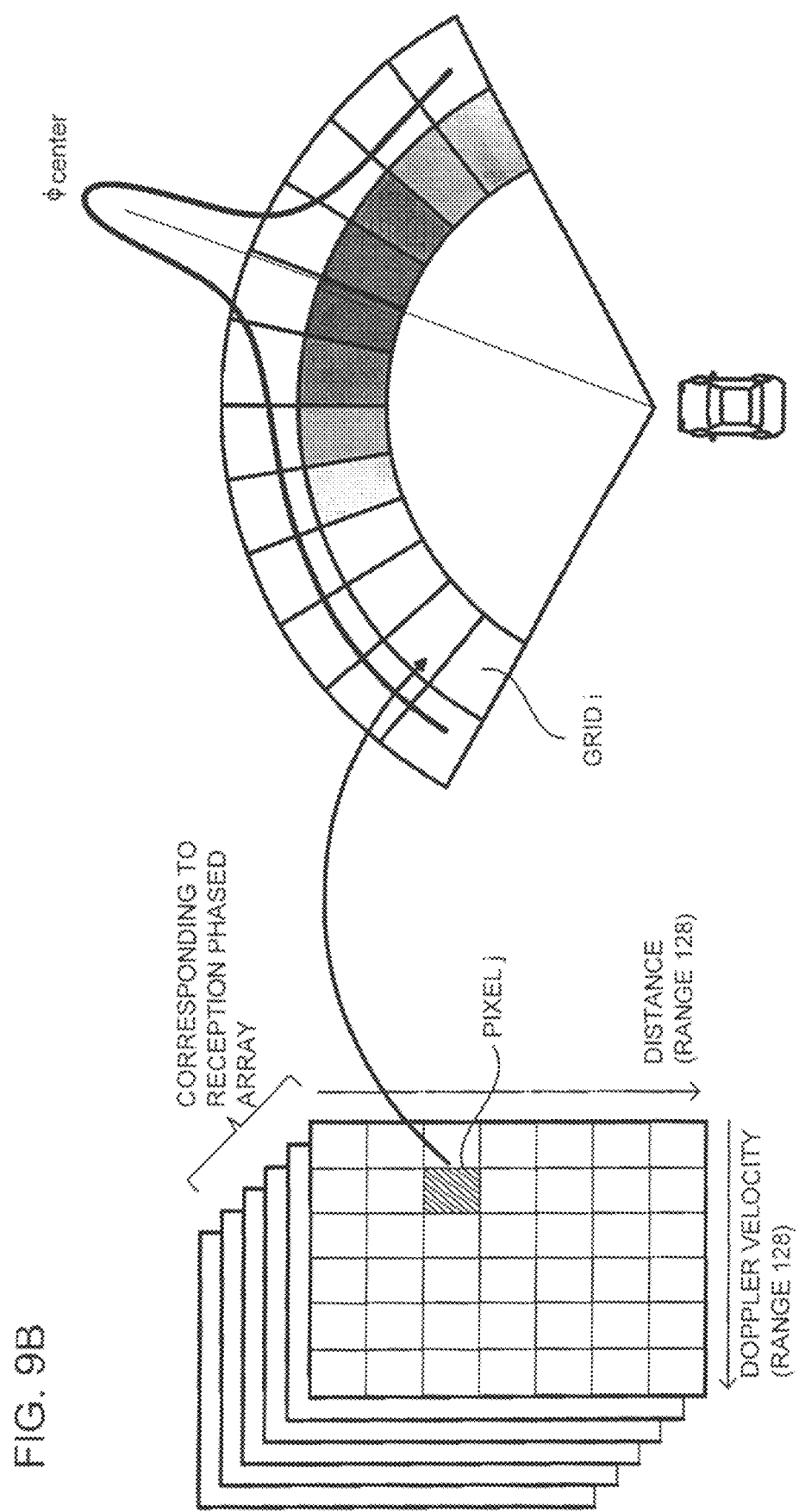

STATIONARY OBJECT

MOVING OBJECT

SURROUNDING ENVIRONMENT ESTIMATION DEVICE AND SURROUNDING ENVIRONMENT ESTIMATING METHOD

TECHNICAL FIELD

The present invention relates to a technique for estimating a surrounding environment from observation data obtained by performing sensing on the surrounding with the use of sensing equipment (a sensor). In particular, the present invention relates to the technique for estimating the surrounding environment of a vehicle from the observation data obtained by using the sensing equipment which is loaded on the vehicle.

BACKGROUND ART

The observation data obtained by performing sensing with the use of the sensing equipment such as a radar is used for estimation of the position and the shape of an object which is located around the sensing equipment, mobility/stationarity (a moving object or a stationary object) of the object and so forth. The observation data includes many uncertain elements such as an observation error or disturbances. Accordingly, it may be necessary to perform some sort of a filtering process in order to obtain accurate information on an object to be observed.

Many of existing techniques for perceiving and estimating the surrounding objects from the observation data obtained by using the sensing equipment are based on stochastic methods. As one of such stochastic methods, there exists a method which has been firstly proposed by Non-Patent Document 1 described below and has used an Occupancy Grid Map. In the following, a method of using the occupancy grid map which has been proposed again in Non-Patent Document 2 described below will be briefly described on the basis of the method which has been firstly proposed by Non-Patent Document 1.

The method of using the occupancy grid map includes the following steps: preparing the occupancy grid map that a surrounding space to be observed is partitioned into grids; and calculating an occupation probability p(m) which indicates whether each of the grids is in an occupied state (the occupied state is designated by "m") or in an unoccupied state, that is, whether a space in that grid is physically filled. FIG. 1 shows one example of the occupancy grid map of related art.

When an observation has been performed in a t time-frame (a time t), the probability as to whether the grid (each area which is partitioned in the form of grid in FIG. 1) which corresponds to the space sensed by a sensor is occupied or unoccupied is calculated and updated. According to the technique proposed in Non-Patent Document 2, an updating formula of the occupation probability p(m) is expressed by the following formula (1) for a certain grid i and a state in the t time frame (the time t) is derived from a state in a t−1 time frame (a time t−1) by the numerical formula (1).

[Numerical Formula 1]

$$\log\frac{p(m_i \mid z_1, \ldots, z_t)}{1 - p(m_i \mid z_1, \ldots, z_t)} = \log\frac{p(m_i \mid z_t)}{1 - p(m_i \mid z_t)} + \log\frac{1 - p(m_i)}{p(m_i)} + \log\frac{p(m_i \mid z_1, \ldots, z_{t-1})}{1 - p(m_i \mid z_1, \ldots, z_{t-1})} \quad (1)$$

In the formula (1), additions are performed for the occupation probability p(m) by using a logarithm (LogOdds) of a value that the occupation probability p(m) has been divided by a non-occupation probability 1−p(m) as a unit.

The left side of the formula (1) is logarithmic odds of an occupation probability $p(m_i | z_1, \ldots, z_t)$ which has been obtained up to the t time frame (the time t) and indicates the latest estimation result of the occupation probability p(m) in the grid i. The left side (that is, the latest estimation result of the occupation probability p(m)) of the formula (1) is obtained by calculating the right side of the formula (1). The left side of the formula (1) is called a logarithm-likelihood ratio in the observation performed up to the time t.

The right-side first term of the formula (1) is logarithmic odds of an occupation probability $p(m_i | z_t)$ of an observation intensity $z_t$ of the t time frame (the time t) in the grid i. A result of observation performed in the t time frame (the time t) in the grid i which has been obtained by the sensor is substituted into the right-side first term. The right-side first term of the formula (1) is called a logarithm-likelihood ratio in observation performed at the time t.

The right-side second term of the formula (1) indicates an initial value and is logarithmic odds of an occupation probability $p(m_i)$ which has been set as the initial value in the grid i. The occupation probability $p(m_i)$ in an initial state where no observation is performed may be set to, for example, $p(m_i)=0.5$.

The right-side third term of the formula (1) is logarithmic odds of an occupation probability $p(m_i | z_1, \ldots, z_{t-1})$ which has been obtained up to a t−1 time frame (a time t−1) in the grid i and a value of a result of estimation (the left side of the formula (1) which has been obtained by a calculation performed directly before the estimation) which has been obtained in the calculation performed directly before the estimation is substituted into the right-side third term. The right-side third term of the formula (1) is called a logarithm-likelihood ratio in observation performed up to the time t−1.

When the occupation probability $p(m_i)$ in the initial state has been set to $p(m_i)=0.5$ as mentioned above, also the non-occupation probability $1-p(m_i)$ is set to $1-p(m_i)=0.5$ and therefore the right-side second term of the formula (1) is set to zero. That is, when $p(m_i)=0.5$ has been set as the initial value, the value of the logarithm-likelihood ratio in the observation performed up to the time t is obtained by adding a value of the logarithm-likelihood in the observation performed at the time t to a value of the logarithm-likelihood ratio in the observation performed up to the time t−1. Since this updating formula is repetitively calculated, the updating formula of the occupation probability $p(m_i)$ can be expressed by the sum total as expressed in the following formula (2).

[Numerical Formula 2]

$$\log\frac{p(m_i \mid z_1, \ldots, z_T)}{1 - p(m_i \mid z_1, \ldots, z_T)} = \sum_{t=1}^{T} \log\frac{p(m_i \mid z_t)}{1 - p(m_i \mid z_t)} \quad (2)$$

Since the above-mentioned formula (2) is calculated on the assumption that the observation is performed one time at intervals of the time t, also when a number of times of observation has been used as a parameter, the updating formula of the occupation probability $p(m_i)$ can be expressed by the similar formula. That is, assuming that the parameter of the number of times of observation is denoted by k and that the formula (1) is repetitively calculated also K times similarly when the observation has been performed K times, the updating formula of the occupation probability $p(m_i)$ can be expressed by the sum total as the following formula (3).

[Numerical Formula 3]

$$\log \frac{p(m_i \mid z_1, \ldots, z_K)}{1 - p(m_i \mid z_1, \ldots, z_K)} = \sum_{k=1}^{K} \log \frac{p(m_i \mid z_k)}{1 - p(m_i \mid z_k)} \quad (3)$$

The left side of the formula (3) is logarithmic odds of an occupation probability $p(m_i \mid z_1, \ldots, z_K)$ which has been obtained until the observation has been performed K times in the grid i, that is, a logarithm-likelihood ratio in the observation which has been performed K times.

In addition, in the following Patent Document 1, a technique for perceiving and estimating the surrounding objects by using the occupancy grid map is disclosed. In the technique disclosed in Patent Document 1, estimation of a dynamic dead angle area formed by a moving object is performed on the basis a difference between a static dead angle area on the occupancy grid map and a current dead angle area which is based on a current detection position.

RELATED ART DOCUMENT

Patent Document

[Patent Document 1]: Japanese Patent Application Publication No. 2011-123551 (Abstract, paragraph [0046])

Non-Patent Document

[Non-Patent Document 1]: "Using Occupancy Grids for Mobile Robot Perception and Navigation", Alberto Elfes, Carnegie Mellon University. IEEE 0018-9162/89/0600-0046, 1989

[Non-Patent Document 2]: "Learning Occupancy Grid Maps with Forward Sensor Models", Sebastian Thrun, Autonomous Robots—Springer Journals, DOI: 10.1023/A:1025584807625, Published: Sep. 1, 2003

[Non-Patent Document 3]: "Optimum Array Processing: Part IV of Detection, Estimation and Modulation Theory", Wiley-Interscience, ISBN 0-471-09390-4, 2002

SUMMARY OF THE INVENTION

In a sensor model of related art, it is assumed that a wave of the radar which is propagated from the sensor is high in straightness and the wave radiated from the sensor and returned by being reflected from an object is regarded just like a ball which is thrown straight, hits against something and then returns. It is perceived that an object of some kind is present at a place against which the wave of the radar has hit and from which the wave has been reflected. For example, as shown in FIG. 1, the grid on the occupancy grid map which corresponds to that place is set to be in an occupied state (a black grid in FIG. 1) and a grid which is present on a straight line connecting between the sensor and the place where the object of some kind has been perceived is regarded as a path along which the wave of the radar has passed and is set as a nil space, that is, to be in an unoccupied state (a white grid in FIG. 1).

For example, in the technique disclosed in the above-mentioned Patent Document 1, when a certain object has been perceived, processing of reducing a presence probability of the object in a block (the grid) which is present on the straight line extending from an own vehicle to the object is performed on the assumption that other objects are not present on the straight line extending from the own vehicle to the object.

However, since the wave of the radar has wave properties such as scattering, diffraction and reflection, greatly differently from a case where the ball is thrown and then is returned, the wave may pass along various paths (a so-called multi-path). As a result, there are cases where the wave goes around behind the object and the wave is scattered and reflected from various objects repetitively. Accordingly, even when another object is present on the straight line connecting together the sensor and the place where the object of some kind has been perceived, another object may not be perceived in some cases and it is difficult to determine that the area on the straight line is in the unoccupied state simply by connecting together the sensor and the perceived object with the straight line.

In addition, in the existing methods, for example, only pixels which are higher in intensity than a threshold value determined in advance are selected among pixels in the observation data space and the calculation for updating using the above-mentioned formula (1) and so forth is performed only for the grids in a physical space which are set in one-to-one correspondence with the selected pixels. However, the actual observation data is uncertain due to various factors of the environment for observation as mentioned above and a novel method which covers such uncertainty is desirable.

The present invention has been made in view of the above-mentioned disadvantages and proposes a novel sensor model. The present invention aims to provide a surrounding environment estimation device and a surrounding environment estimating method so as to make it possible to estimate the surrounding environment with higher accuracy from observation data obtained by using sensing equipment.

For this purpose, according to one embodiment of the present invention, there is provided a surrounding environment estimation device for estimating the presence of an object in a surrounding space from observation data obtained by using sensing equipment, the sensing equipment including a transmitter configured to transmit a sensing signal and a receiver configured to receive the sensing signal reflected and returning to the sensing equipment, the surrounding environment estimation device comprising:

an intensity value likelihood calculation unit that calculates an intensity value of the sensing signal received by the receiver on the basis of the observation data and that calculates a likelihood indicating whether or not the sensing signal received by the receiver is a signal reflected from a detected object on the basis of the intensity value;

a distribution function calculation unit that calculates an azimuth angle of the detected object on the basis of the observation data and that calculates a distribution function of an angle indicating the degree of dispersion centering on the azimuth angle on the basis of the intensity value; and an occupancy grid map calculation unit that performs calculations for updating an occupation probability of the object in each grid of a plurality of grids in an occupancy grid map by using a value obtained by dispersing the likelihood using the distribution function, the occupancy grid map including the plurality of grids by partitioning the surrounding space, and the occupancy grid map describing the occupation probability of the object in each grid of the plurality of grids, wherein the surrounding environment estimation device is configured to prepare the occupancy grid map based on a plurality of pieces of observation data by performing the calculation by the intensity value likelihood calculation unit, the calculation by the distribution function calculation unit and the calculation by the occupancy grid map calculation unit on the basis of the plurality of pieces of observation data.

In addition, for this purpose, according to another embodiment of the present invention, there is provided a surrounding environment estimating method of estimating the presence of an object in a surrounding space from observation data obtained by using sensing equipment, the sensing equipment including a transmitter configured to transmit a sensing signal and a receiver configured to receive the sensing signal reflected and returning to the sensing equipment, the surrounding environment estimating method comprising:

a intensity value likelihood calculation step of calculating an intensity value of the sensing signal received by the receiver on the basis of the observation data and calculating a likelihood indicating whether or not the sensing signal received by the receiver is a signal reflected from a detected object on the basis of the intensity value;

a distribution function calculation step of calculating an azimuth angle of the detected object on the basis of the observation data and calculating a distribution function of an angle indicating the degree of dispersion centering on the azimuth angle on the basis of the intensity value; and an occupancy grid map calculation step of performing calculations for updating an occupation probability of the object in each grid of a plurality of grids in an occupancy grid map by using a value obtained by dispersing the likelihood using the distribution function, the occupancy grid map including the plurality of grids by partitioning the surrounding space, and the occupancy grid map describing the occupation probability of the object in each grid of the plurality of grids, wherein the occupancy grid map based on a plurality of pieces of observation data is prepared by performing the calculation in the intensity value likelihood calculation step, the calculation in the distribution function calculation step and the calculation in the occupancy grid map calculation step on the basis of the plurality of pieces of observation data.

The present invention has such an advantageous effect that it is possible to estimate the surrounding environment with higher accuracy from the observation data obtained by using the sensing equipment. In particular, when the sensing equipment is loaded on a vehicle, the present invention also has such an advantageous effect that it is possible to estimate the surrounding environment of the vehicle with higher accuracy.

BRIEF DESCRIPTION OF THE DRAWINGS

FIG. 9A is a diagram illustrating one example of a situation of dispersion shown in FIG. 8 by mutually superposing the horizontal axis which indicates an angular direction and an array of grids which are arranged in the angular direction.

FIG. 9B is a diagram schematically illustrating one example of an observation data space in the left side and a physical space in the right side, for describing a situation where a pixel j is mapped in a plurality of grids i by taking that the probability of the presence of the object is broadened into consideration.

DESCRIPTION OF THE EMBODIMENTS

In the following, preferred embodiments of the present invention will be described with reference to the accompanying drawings.

First Embodiment

Figure 1:
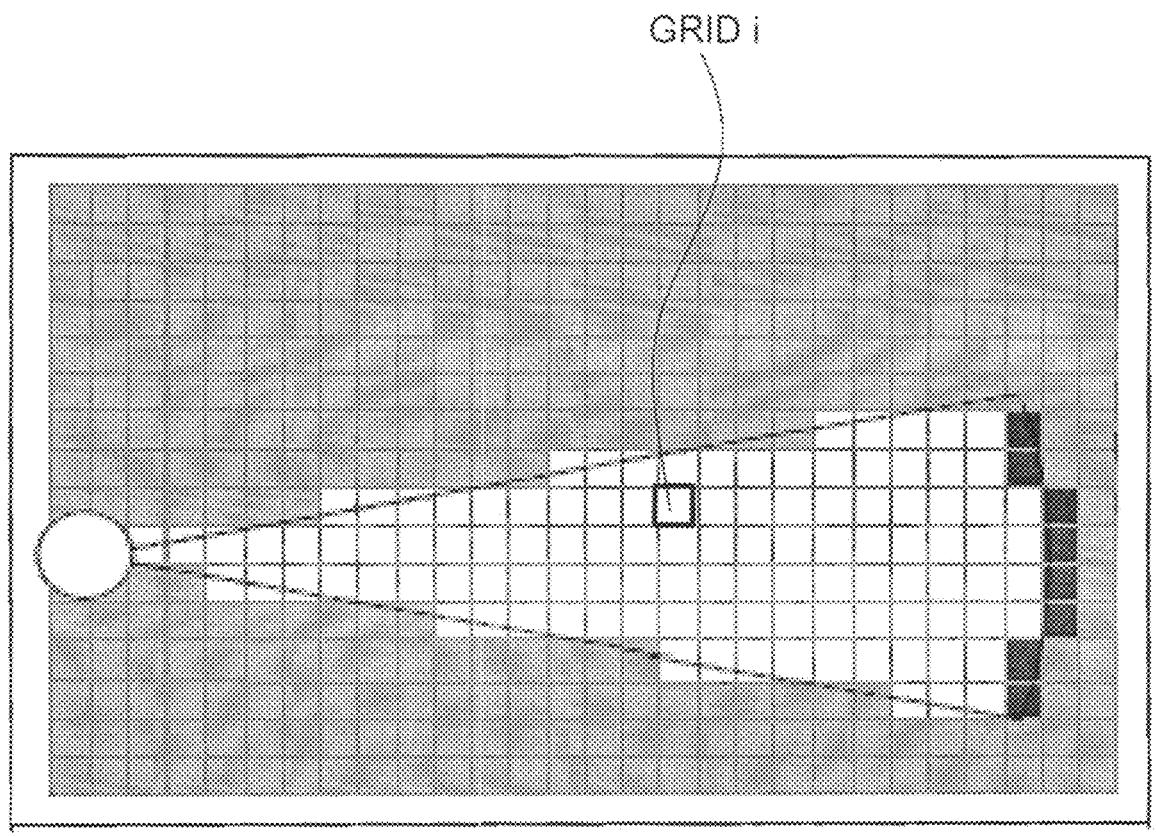
FIG. 1 is a diagram illustrating one example of an occupancy grid map in related art.
Figure 2:
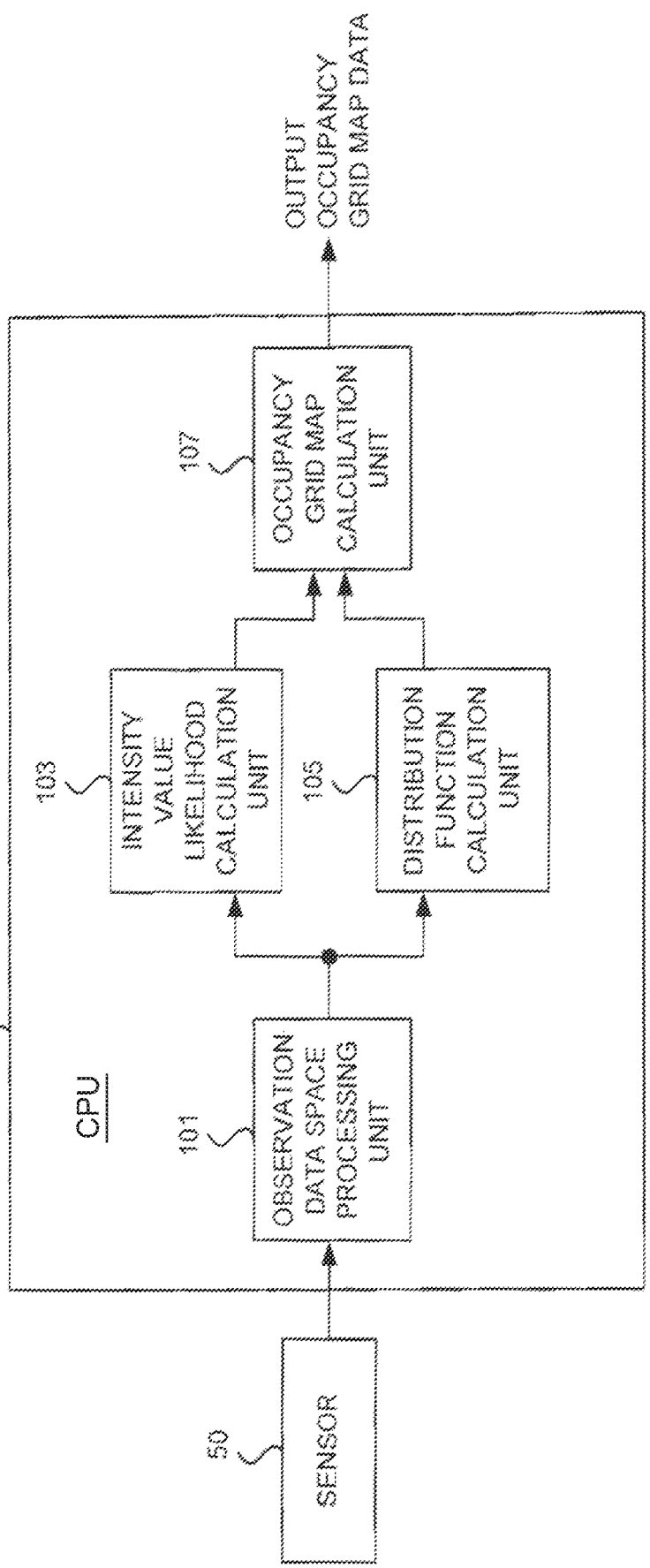
FIG. 2 is a diagram illustrating one example of a configuration of a surrounding environment estimation device according to a first embodiment of the present invention.

In the following, the first embodiment of the present invention will be described. First, one example of a configuration of a surrounding environment estimation device according to the first embodiment of the present invention will be described with reference to FIG. 2. FIG. 2 shows one example of the configuration of the surrounding environment estimation device according to the first embodiment of the present invention. The surrounding environment estimation device 10 shown in FIG. 2 includes an observation data space processing unit 101, an intensity value likelihood calculation unit 103, a distribution function calculation unit 105, and an occupancy grid map calculation unit 107.

The observation data space processing unit 101 has a function of performing processing so as to make it possible to handle observation data obtained from a sensor (sensing equipment) 50 as data on an observation data space. That is, the observation data space processing unit 101 constructs the observation data space on the basis of the observation data obtained from the sensor 50.

Figure 6:
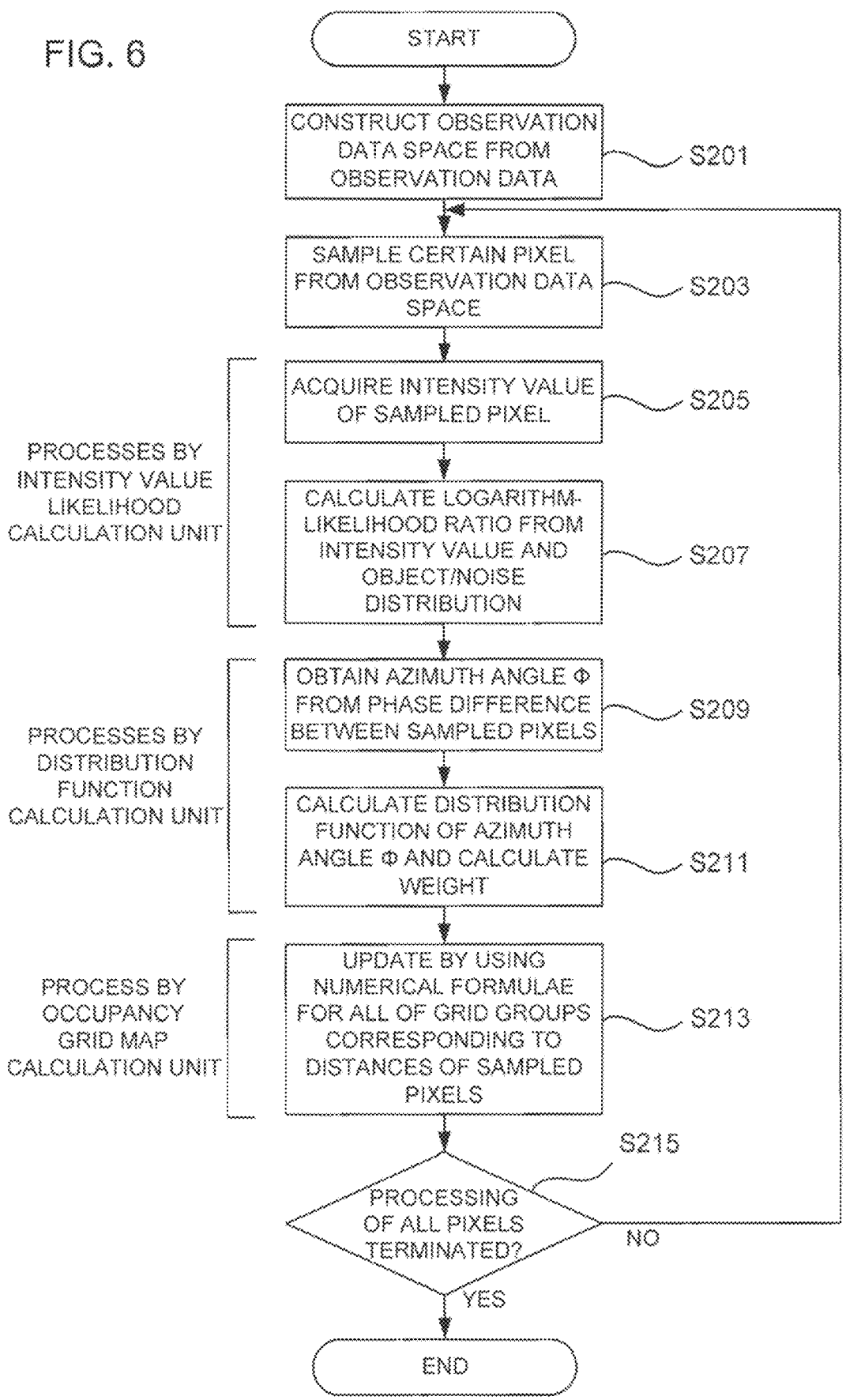
FIG. 6 is a flowchart illustrating one example of processing performed in the first embodiment of the present invention.

The intensity value likelihood calculation unit 103 has a function of acquiring an intensity value relating to a specific pixel which is present in the observation data space and calculating a likelihood ratio corresponding to the intensity value so acquired. Although, for example, processes in step S205 and step S207 shown in FIG. 6 are performed by the intensity value likelihood calculation unit 103, details thereof will be described later.

The distribution function calculation unit 105 has a function of acquiring a phase difference relating to the specific pixel which is present in the observation data space and calculating a distribution function of the phase difference so acquired. Although, for example, processes in step S209 and step S211 shown in FIG. 6 are performed by the distribution function calculation unit 105, details thereof will be described later.

The occupancy grid map calculation unit 107 has a function of calculating the occupancy grid map corresponding to a physical space around the sensor 50 by using the likelihood ratio which has been calculated by the intensity value likelihood calculation unit 103 and the distribution function of the phase difference which has been calculated by the distribution function calculation unit 105. Although, for example, a process in step S213 shown in FIG. 6 is performed by the occupancy grid map calculation unit 107, details thereof will be described later. The occupancy grid map calculated by the occupancy grid map calculation unit 107 is output as occupancy grid map data and may be stored into an optional recording medium and/or may be utilized by being supplied to other optional devices.

Figure 3:
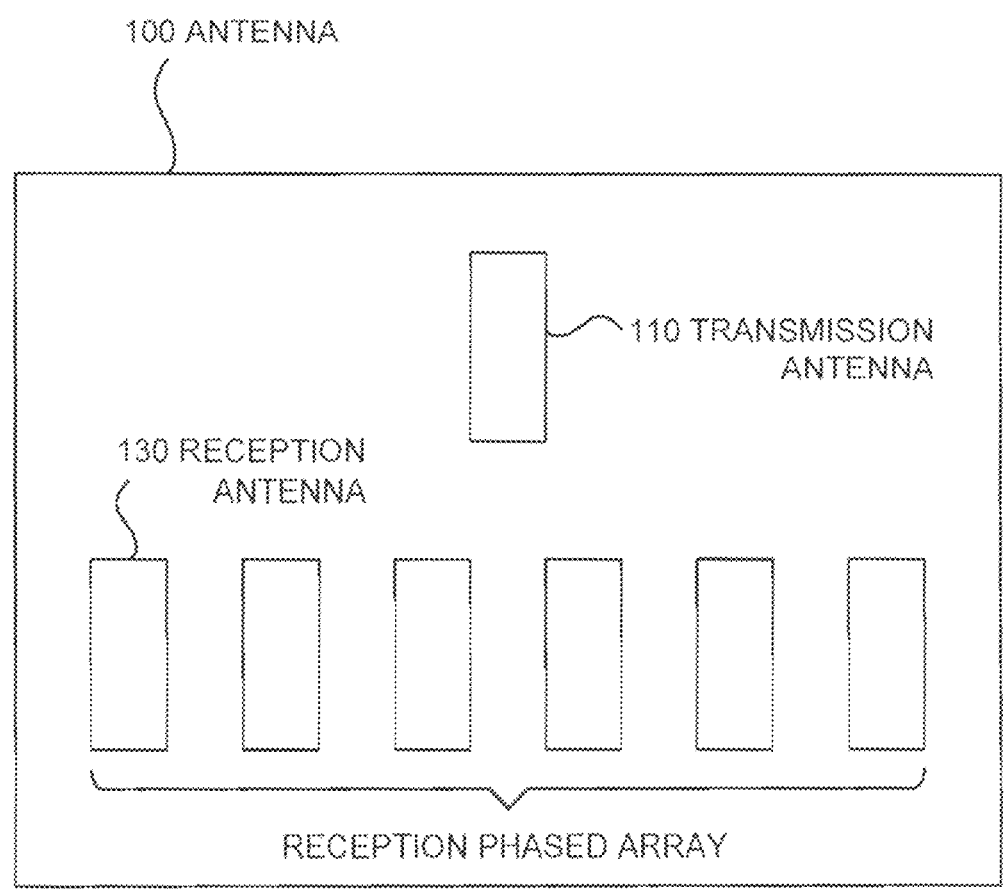
FIG. 3 is a diagram illustrating one example of an antenna configuration of a sensor to be used in the first embodiment of the present invention.

In the first embodiment of the present invention, for example, as shown in FIG. 3, a sensor including an antenna 100 having one transmission antenna 110 and a plurality of reception antennas 120 is used as the sensor 50 which is adapted to obtain the observation data. A wave (a radio wave) which includes a sensing signal is radiated from the transmission antenna 110, and the wave which has returned by being reflected from the object which is present around the sensor 50 is sensed by the plurality of reception antennas 120. In this case, it is possible to sense an azimuth of the object because the plurality of antennas 120 is arranged in an array (a reception phased array).

The antenna 100 used in the first embodiment of the present invention is not limited to the antenna having the configuration such as the reception phased array shown in FIG. 3 and may be an antenna of another configuration having a function of sensing the azimuth of the object. In addition, although in FIG. 3, the antenna 100 of the configuration which includes one transmission antenna 110 is shown, the antenna 100 may include two or more transmission antennas 110.

Here, the observation data space that the observation data obtained by sensing performed by the sensor 50 is arranged and the physical space (corresponding to the physical space around the sensor 50 which serves as a sensor model) that the occupancy grid map which is prepared on the basis of the observation data is arranged will be described with reference to FIG. 4.

The observation data obtained by sensing is expressed as the observation data space. Complex number data configured by a two-dimensional space of "Distance—Doppler Velocity" (that is, a distance from the sensor to the object and a Doppler velocity of the wave between the sensor and the object) is acquired from a phase of the sensed wave of the radar. One example of this situation is shown in the left side of FIG. 4.

Figure 4:
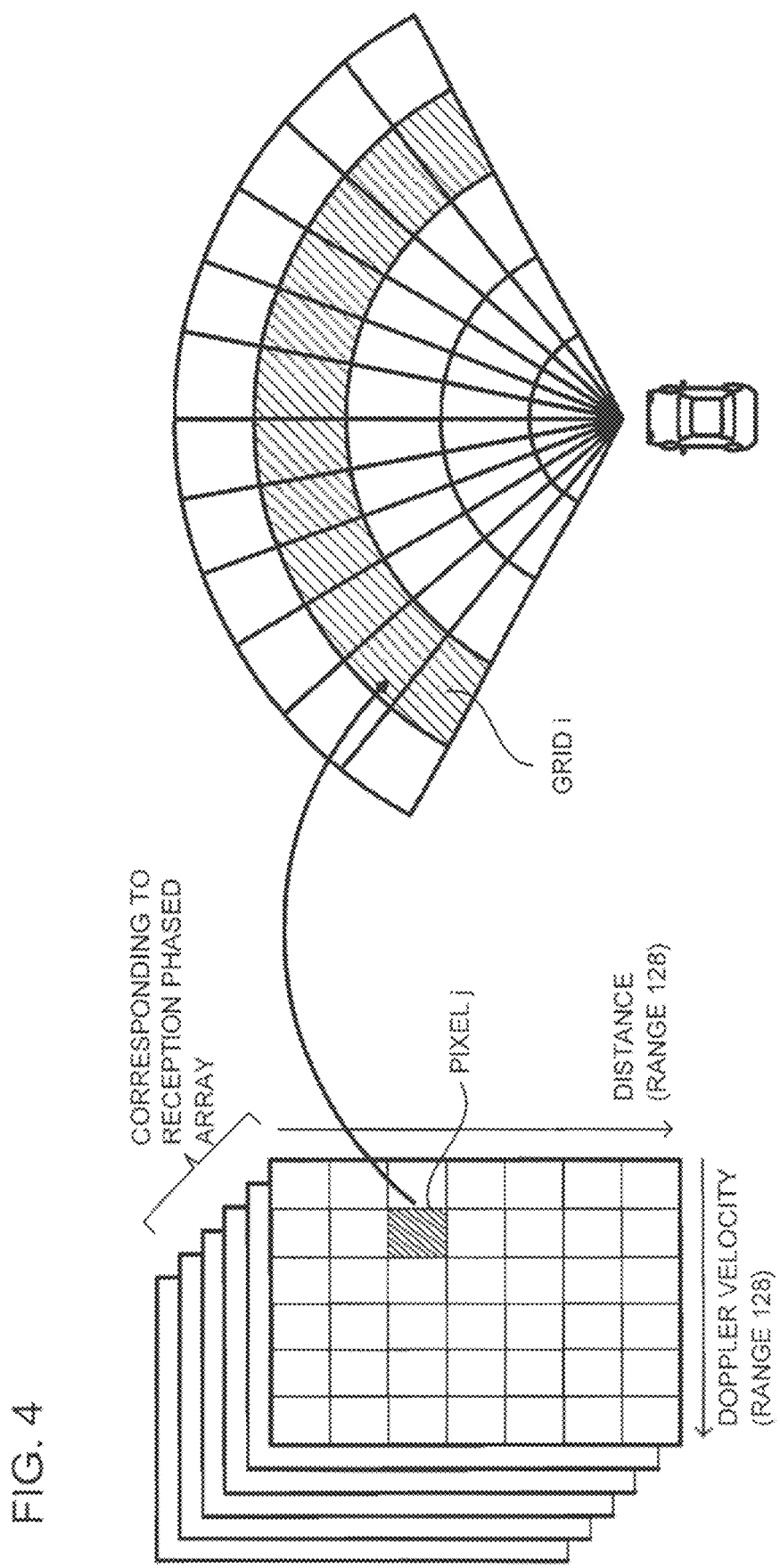
FIG. 4 is a diagram schematically illustrating one example of an observation data space and a physical space, and showing in the left side that observation data obtained by sensing using the sensor is mapped in the observation data space and showing the right side that an occupancy grid map prepared on the basis of the above observation data is arranged in the physical space.

One example of the observation data space in which the observation data obtained by sensing performed by the sensor 50 is mapped is schematically shown in the left side of FIG. 4. The observation data space shown in the left side of FIG. 4 is configured by the two-dimensional space that the distance is plotted on the vertical axis (the vertical axis: for example, the range (128)) and the Doppler velocity is plotted on the horizontal axis (the horizontal axis: for example, the range (128)). The two-dimensional space is configured by "pixels" each corresponding to a specific distance and a specific Doppler velocity. A complex number value configured by the two-dimensional space of "Distance—Doppler Velocity" is put into each pixel. The square of an absolute value of the complex number indicates the intensity (the intensity of the signal).

In addition, in the left side of FIG. 4, the plurality of two-dimensional spaces (in the example in the left side of FIG. 4, six of two-dimensional spaces are shown in conformity to the configuration of the antenna 100 shown in FIG. 3) is shown corresponding to the reception phased array of the antenna 100. The observation data is sensed by each of the plurality of antennas 120 which configures the reception phased array and thereby it is possible to estimate an azimuth angle ϕ from the phase difference between the respective pieces of the observation data.

On the other hand, one example of the physical space around the sensor 50 which serves as the sensor model is shown in the right side of FIG. 4. For example, as shown in the right side of FIG. 4, the physical space around the sensor 50 is expressed in circular polar coordinates configured by a distance r and the azimuth angle ϕ in front of the sensor 50

(in the example in the right side of FIG. 4, it is assumed that the sensor 50 is installed on the vehicle). The two-dimensional space which is expressed in the circular polar coordinates is configured by "grids" each corresponding to a specific distance and a specific azimuth angle. Accordingly, each grid indicates a two-dimensional value of "Distance—Azimuth Angle".

In the specification, in order to avoid confusion, a minute area (a unit area) in the observation data space such as that shown in the left side of FIG. 4 is called a "pixel" and a minute area (a unit area) in the physical space such as that shown in the right side of FIG. 4 is called a "grid" or an "occupancy grid" so as to definitely discriminate between these minute areas. That is, the pixel is a discrete minute area obtained by partitioning the observation data space and the grid is a discrete minute area obtained by partitioning the physical space. In addition, in the specification, the letter "j" is used for the index of the pixel and the letter "i" is used for the index of the grid or the occupancy grid.

Figure 5A:
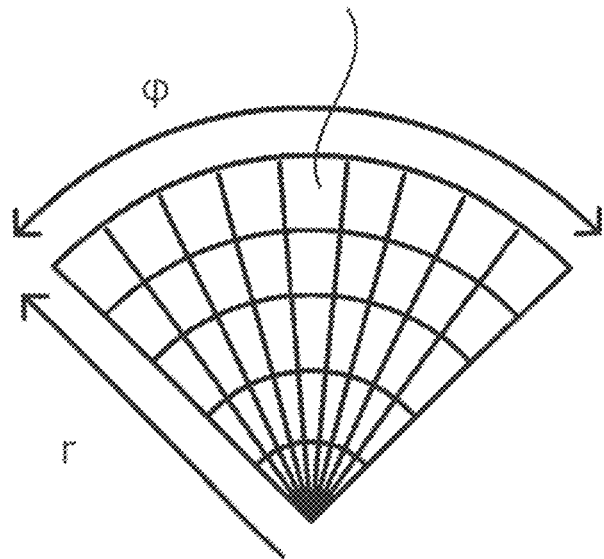
FIG. 5A is a diagram illustrating one example of a two-dimensional space that the occupancy grid map is arranged.
Figure 5B:
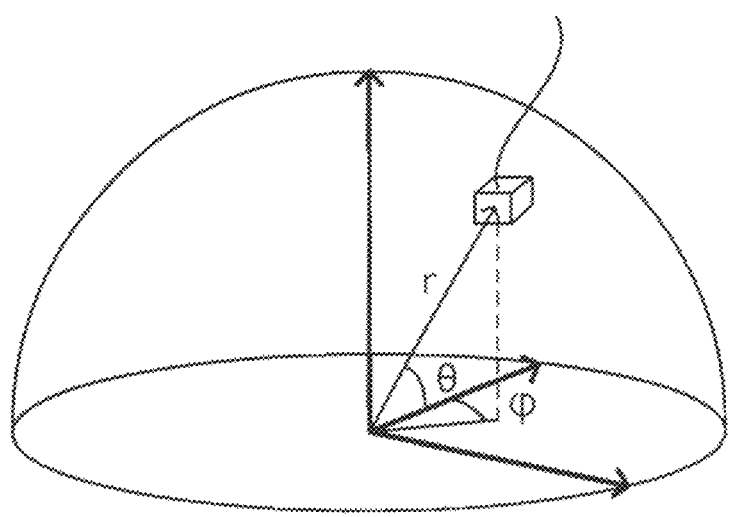
FIG. 5B is a diagram illustrating one example of a three-dimensional space that the occupancy grid map is arranged.

As shown in FIG. 5A, the occupancy grid map may be configured by two-dimensional occupancy grids (the two-dimensional space) expressed, for example, in the circular polar coordinates (r, φ) and/or may be configured by three-dimensional occupancy grids (a three-dimensional space) expressed, for example, in spherical coordinates (r, φ, Θ) as shown in FIG. 5B. In the following, in the specification, although description will be made by taking the occupancy grid map having the two-dimensional occupancy grids (the two-dimensional space) expressed in the circular polar coordinates (r, φ) by way of example for better understanding of the present invention, the present invention is not limited to this occupancy grid map.

Further, in the specification, a range of a viewing angle of the two-dimensional space of the circular polar coordinate system which configures the occupancy grid map to be prepared is set to about 90 degrees for simplification of description. In addition, in the entire form of the two-dimensional space of the circular polar coordinate system, for example, a range of a sensing distance is set up to 60 m and a range of a sensing azimuth angle is set from −40 degrees to 40 degrees. The grid in the physical space shown in the right side of FIG. 4 is shaped into the form of a fan of the size which matches the size of the two-dimensional space of the circular polar coordinate system which configures the occupancy grid map so as to make the physical space fit the observation data space, in conformity to the area which is sensed by the sensor 50. In the first embodiment of the present invention, the observation data space and the physical space are configured in this way so as to make it possible to reflect in what kind of probability distribution the data of one pixel which is present in the observation data space shown in the left side of FIG. 4 is present across the plurality of grids in the physical space.

Correspondence between the observation data space shown in the left side of FIG. 4 and the physical space around the sensor 50 which serves as the sensor model is summarized as follows.

In regard to the complex number which occupies each pixel of the two-dimensional discrete data of "Distance—Doppler Velocity" in the observation data space shown in the left side of FIG. 4, the square of the absolute value of the complex number indicates the intensity and it is thought that a point which is larger in intensity value than others is a reflection point which is stronger in reflection than others.

The vertical axis of "Distance—Doppler Velocity" of the observation data space shown in the left side of FIG. 4 indicates a distance from an observation point (the position of the sensor 50) to the reflection point, corresponds to a distance measured from the front of the vehicle, for example, in the fan in the right side of FIG. 4 and is in a range from 0 m to 60 m.

The horizontal axis of "Distance—Doppler Velocity" of the observation data space shown in the left side of FIG. 4 indicates a value relating to the velocity due to the Doppler effect measured along a direction of a line which connects together the sensor and the reflection point. This velocity corresponds to a relative velocity of a velocity (for example, the velocity of the vehicle on which the sensor 50 is loaded) at the observation point with respect to a velocity of the object which is present at the reflection point.

The two-dimensional space of "Distance—Doppler Velocity" of the observation data space shown in the left side of FIG. 4 is present by the number corresponding to the number of the reception antennas 120 which configure the reception phased array. Thus, it is possible to estimate, from the phase difference between the values of the complex number of pixels which are present at the same positions in the respective two-dimensional spaces, the azimuth angle φ at which the reflection point corresponding to each of these pixels has been viewed.

The first embodiment of the present invention has such a feature that the calculation is performed in a state where the observation data of one pixel in the observation data space is made to distribute across the plurality of grids such that one pixel in the observation data space imparts influence on the plurality of grids, instead of performing the calculation in a state of setting the observation data of one pixel in the observation data space in one-to-one correspondence with a grid concerned in the physical space. In this case, the observation data of one pixel in the observation data space is made to distribute across the plurality of grids such that the lower the intensity of one pixel in the observation data space is, the more dispersion of an estimated value of the corresponding azimuth angle φ in the physical space is broadened, that is, the more the correspondence between the pixel and the grid concerned in the physical space becomes uncertain.

In the existing method, in the pixels in the observation data space, only the pixels which are higher in intensity than a threshold value predetermined in advance are selected and the calculation for updating using the above-mentioned formula (1) is performed only for the grids in the physical space which are set in one-to-one correspondence with the selected pixels.

In contrast, in the present invention, selection that the intensity of each pixel in the observation data space is considered is not performed, and the calculation is performed for all of the pixels. In the present invention, the number of the grids i in the physical space which correspond to a pixel j concerned is not limited to one. The calculation for updating is performed using the numerical formulae proposed by the present invention for all of the grid groups in the physical space in the area which is included in a probability distribution.

In the following, the procedure of specific processing according to the first embodiment of the present invention will be described. FIG. 6 is a flowchart illustrating one example of the processing according to the first embodiment of the present invention. The description will be made on the assumption that the processing is performed by the surrounding environment estimation device 10 shown in FIG. 2. In the following, first, an outline of the processing according to the first embodiment of the present invention will be described on the basis of FIG. 6 and then processes in respective steps, numerical formulae used for calculation and so forth will be described in detail.

In FIG. 6, the observation data space processing unit 101 receives the observation data sensed by the sensor 50 and constructs the observation data space (step S201). Specifically, the observation data space processing unit 101 arranges the pieces of observation data which have been respectively received from the plurality of antennas 120 which is included in the antenna 100 of the sensor 50 on such observation data spaces as shown in the left side of FIG. 4 and acquires each value of the complex number of "Distance—Doppler Velocity" which has been set in correspondence with each pixel.

Then, the surrounding environment estimation device 10 samples a pixel concerned from the observation data space (step S203). The pixel to be sampled is an optional pixel in the entire observation data space (or the entire partial space of interest in the observation data space). The surrounding environment estimation device 10 sequentially samples the pixels in the entire observation data space in conjunction with performance of a later described process in step S215. That is, the surrounding environment estimation device 10 sequentially performs processes (the processes in step S205 to step S213) between step S205 and step S215 on the respective pixels in the entire observation data space.

Data (the value of the complex number) included in each of the pixels which have been sampled in step S203 is processed by each of the intensity value likelihood calculation unit 103 and the distribution function calculation unit 105. The processes in step S205 and step S207 are performed by the intensity value likelihood calculation unit 103, the processes in step S209 and S211 are performed by the distribution function calculation unit 105 and the process in step S213 is performed by the occupancy grid map calculation unit 107.

The intensity likelihood calculation unit 103 obtains the intensity value of each of the sampled pixels (step S205). It is possible to obtain the intensity value of a received signal, for example, by squaring the absolute value of the complex number included in the sampled pixel and here the intensity value is converted into a decibel (dB) value by taking the logarithm of the intensity value. Then, the intensity value likelihood calculation unit 103 calculates a logarithm-likelihood ratio corresponding to the intensity value (dB) on the basis of the intensity value (dB) calculated in step S205 and a likelihood distribution table of a reflection intensity of the object and an intensity of the noise (step S207).

On the other hand, the distribution function calculation unit 105 obtains the azimuth angle $\phi$ from the phase difference between the sampled pixels (step S209). For example, pieces of the observation data obtained from the plurality of array-type reception antennas 120 are set in correspondence with the sampled pixels. Thus, it is possible to estimate the azimuth angle $\phi$ on the physical space which corresponds to the pixel j concerned from the phase difference between the respective pieces of observation data. Then, the distribution function calculation unit 105 calculates the distribution function indicating the degree of dispersion of the estimated value of the azimuth angle $\phi$ and calculates a weight $W(\phi_{i,j})$ from the distribution function (step S211). As described later, it is possible to obtain the degree of dispersion of the estimated value of the azimuth angle $\phi$ from, for example, the intensity value (dB) and CRB (Cramer Rao Bound) and it is possible to obtain the weight by normalizing the distribution function that the azimuth angle $\phi$ (that is, an array of the grids i in left and right directions) is used as a parameter.

Then, the occupancy grid map calculation unit 107 performs calculation for updating by using numerical formulae for the plurality of grids, by utilizing the result (the algorithm-likelihood ratio) of calculation performed by the intensity value likelihood calculation unit 103 and the result (the weight) of calculation performed by the distribution function calculation unit 105 (step S213). As described later, the object which is updated in that case is not a single grid but the plurality of grids, that is, for example, the group of grids of a length corresponding to the distance between the pixel so sampled and the observation point.

The above-mentioned processes in step S205 to step S213 are executed on all of the pixels in the entire observation data space (or the entire partial space of interest in the observation data space (step S215). Then, the occupancy grid map that the values of the occupation probability are set in correspondence with the respective grids i is prepared at the completion of sampling and calculation processing performed on all of the pixels.

In the following, the calculation (calculation processing by the intensity value likelihood calculation unit 103) of the logarithm-likelihood ratio in step S207 will be described. In the received signals that the sensor 50 has received, a signal which is generated under the influence of the noise of some kind is also included in addition to the signal reflected from the object. In the first embodiment of the present invention, the intensity value (dB) is regarded as a probability variable in order to discriminate whether the received signal is the signal reflected from the object or the signal merely derived from the noise from the intensity value of the received signal. That is, when the intensity value (dB) of the certain pixel in the observation data space has been thought of, one probability distribution of the intensity (dB) obtained when the signal has been reflected from the object (in the occupied state m) and another probability distribution of the intensity (dB) obtained when the signal has been derived from the noise (not in the occupied state m) are thought of and the probability variable indicating from which the intensity value (dB) has been obtained, the object or the noise, is calculated on the basis of these probability distributions. The above-mentioned situation is shown in FIG. 7A and FIG. 7B.

Figure 7A:
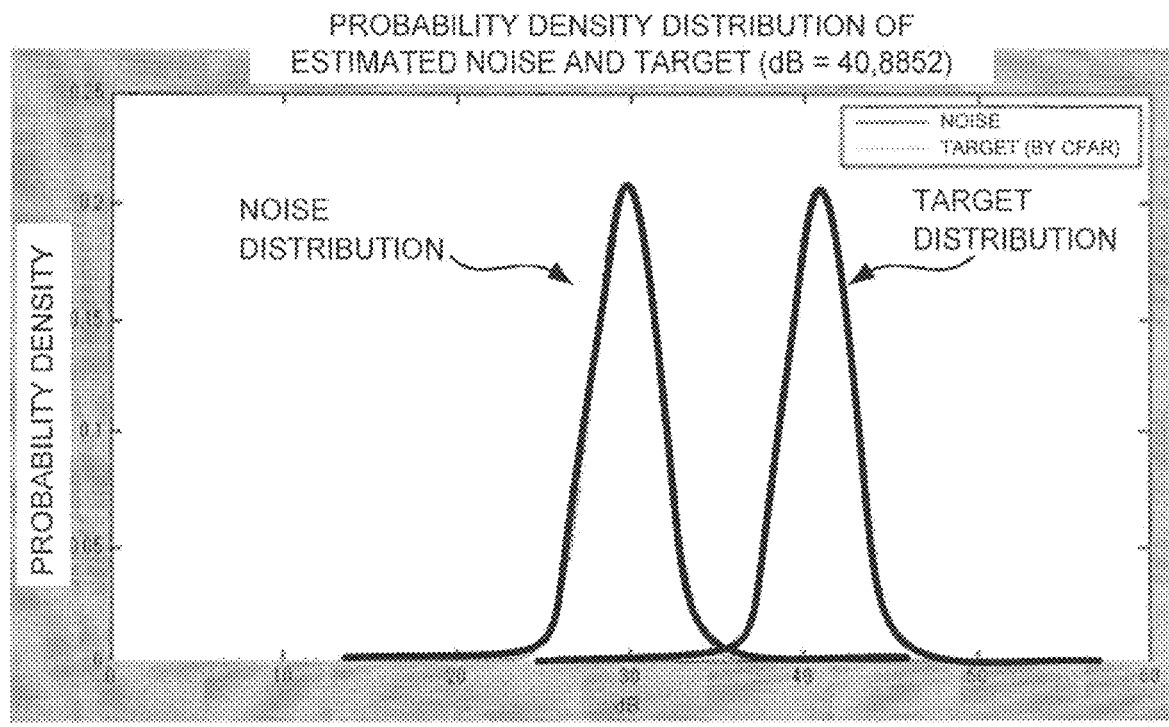
FIG. 7A is a diagram illustrating one example of an intensity probability distribution graph relating to an object and a noise which is used in the first embodiment of the present invention.
Figure 7B:
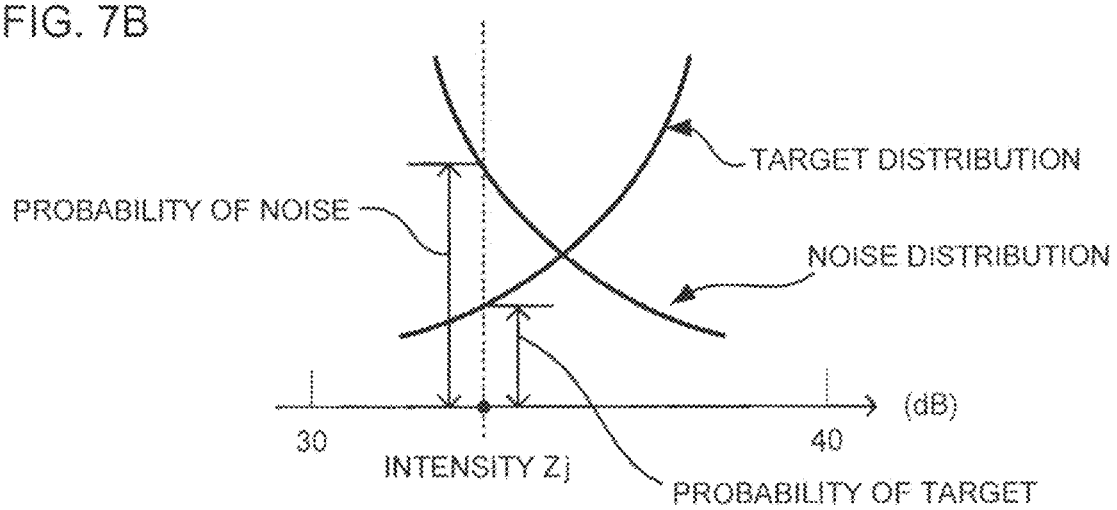
FIG. 7B is a partially enlarged diagram for describing in more detail the graph in FIG. 7A.

One example of a graph of the probability distribution of the intensity (dB) obtained when the signal has been reflected from the object (in the occupied state m) and one example of a graph of the probability distribution of the intensity (dB) obtained when the signal has been derived from the noise (not in the occupied state m) which are used in the first embodiment of the present invention are shown in FIG. 7A. These distributions are obtained before performing processing according to the first embodiment of the present invention. For example, as for a probability of the object, that is, the probability that the signal is reflected from the object (hereinafter, it will be described as the probability of a target in some cases), it is possible to obtain, in advance, the probability distribution (the distribution of the target) of the intensity when the signal has been reflected from the object by collecting the intensity distributions obtained when the signal has been reflected from the object under a known environment. Although the intensity obtained when the signal has been reflected from the object depends on the material quality and the shape of the object, here, the distribution of the target shown in FIG. 7A is obtained on the assumption that the intensity of the signal reflected from the object does not have a value which is less than the intensity of the noise and when the signal exhibits the intensity which is at least an average intensity of the noise, the intensity of the signal reflected from the object exhibits a fixed probability.

In addition, as for a probability of the noise, that is, the probability that the signal is derived from the noise, it is possible to obtain, in advance, the probability distribution (the distribution of the noise) of the noise by collecting the intensity distributions obtained at a place around which no object is present and which is remote from the radar by the distance r. Here, the probability distribution of the noise is supposed to be a Gaussian distribution.

The distribution of the target and the distribution of the noise described above are varied depending on the environment and the kind of the sensor 50 used and a designer is allowed to freely set them. In addition, in the present invention, no limit is set on the shapes of the distributions. In addition, the distribution of the target and the distribution of the noise may be retained in tabular forms (a database and so forth that correspondence of numerical values has been set in advance) and/or may be retained as functions (a calculation is performed on the basis of input numerical values and a result of the calculation so performed is output).

Description will be made in more detail with reference to FIG. 7B that a part in the vicinity of the intensity ranging from 30 to 40 (dB) in the graph shown in FIG. 7A has been enlarged. For example, when an intensity $z_j$ (dB) has been obtained from the pixel j of the observation data concerned, the intensity $z_j$ is plotted as a value on the horizontal axis in each of FIG. 7A and FIG. 7B and the probability of the target and the probability of the noise corresponding to the intensity $z_j$ are obtained as shown in FIG. 7B. Then, it is possible to obtain the occupation probability $p(m|z_j)$ indicating whether the object is present in the grid in the physical space (that is, whether the received signal has been reflected from an object to be detected or is derived from the noise) from the probability of the target and the probability of the noise which correspond to the intensity $z_j$. Further, also the non-occupation probability $1-p(m|z_j)$ is obtained in the same way and the logarithmic odds of the occupation probability as expressed by the following formula (4) are defined as the logarithm-likelihood ratio.

[Numerical Formula 4]

$$\log \frac{p(m|z_j)}{1-p(m|z_j)} \quad (4)$$

The state m included in the formula (4) has no index i and no specification is made as to which occupancy grid i is to be updated for the single pixel j concerned. For the above reason, the logarithm-likelihood ratio expressed by the formula (4) will be called a grid-unspecified logarithm-likelihood ratio.

Then, the calculation of the weight (calculation processing performed by the distribution function calculation unit 105) in step S211 will be described. As described above, the first embodiment of the present invention has the feature that the calculation is performed by making the observation data included in one pixel in the observation data space distribute across the plurality of grids. That is, the first embodiment of the present invention has the feature in the point that the grid-unspecified logarithm-likelihood ratio defined by the formula (4) is used in the calculation for updating the plurality of grids. For example, the grid-unspecified logarithm-likelihood ratio obtained from the intensity of a single pixel j by using the formula (4) is used in the calculation for updating the plurality of grid groups (for example, in the right side of FIG. 4, the plurality of grid groups which is equal to one another in distance measured from the sensor 50 on the front side of the vehicle) which have the distance r which is equal to that of the grid in the physical space which corresponds to the pixel j and have the angle $\phi$ which is different from that of the grid.

As described before, it is possible to estimate to which azimuth angle $\phi$ the pixel j concerned in the observation data space corresponds in the physical space from the phase difference among (between) the plurality of reception antennas 120 which configures the reception phased array. However, it is generally known that when the intensity which has been sampled from the pixel j is low, the dispersion of the estimated azimuth angle $\phi$ is broadened. That is, this means that an estimated position is indefinite centering on an azimuth angle $\phi_{center}$ which has been estimated from the phase difference between the reception antennas 120 across the plurality of grid groups in the left and right directions (a circumferential direction) thereof.

In other words, in the existing technique, since the estimated position is indefinite depending on the intensity, only the pixels of the intensities which are higher than or equal to the predetermined threshold value are sampled and the calculation is performed so as to limit the azimuth angle $\phi$ to one grid. However, in the present invention, all pixels are sampled regardless of the magnitude of the intensities of the pixels and the plurality of grids in the physical space is sequentially updated with the distribution which has been broadened.

Figure 8:
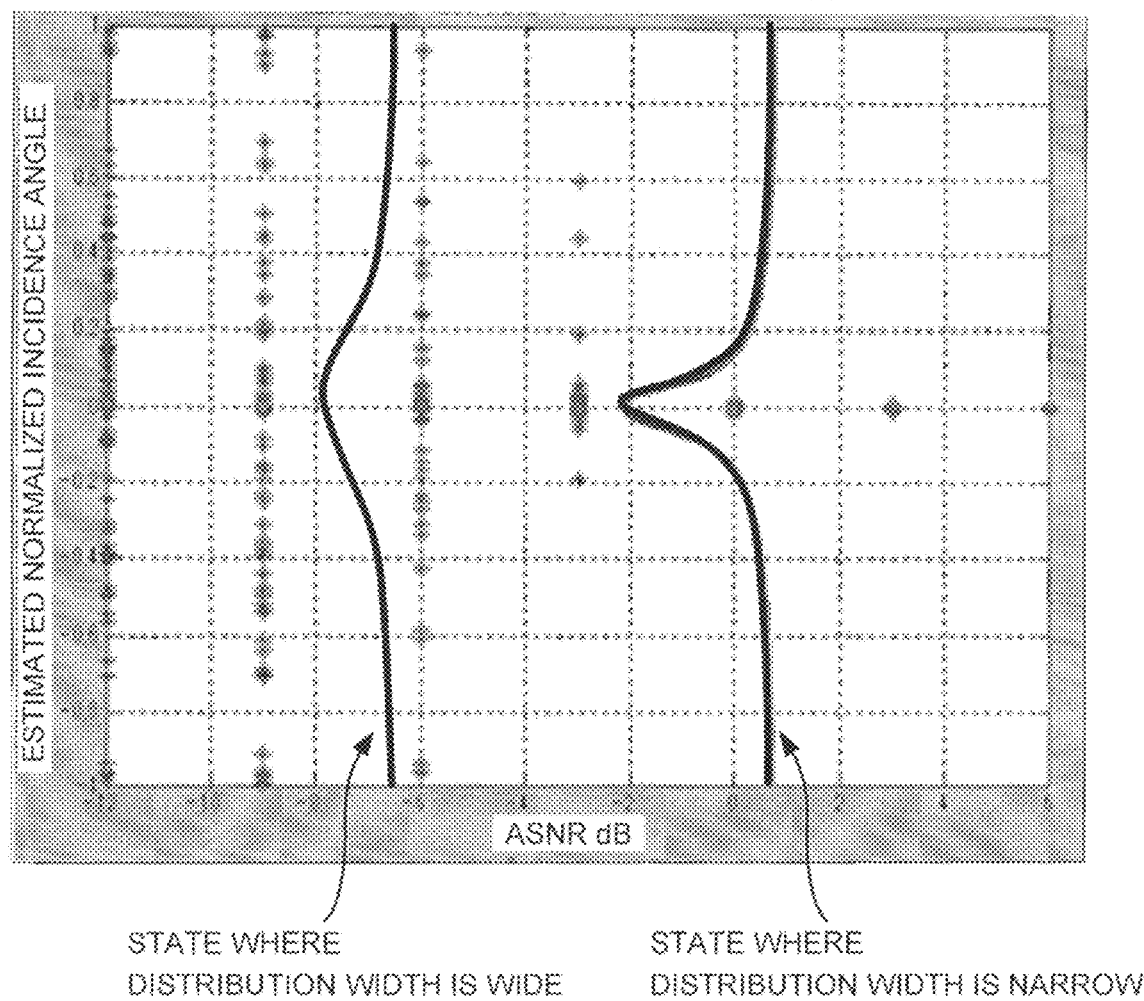
FIG. 8 is a diagram illustrating one example of changes in SNR (signal-to-noise ratio) of a signal and dispersion of an estimated angle of an object which have been observed by an array sensor.

Here, a diagram which is described in Non-Patent Document 3 (see p.p. 994, FIG. 8.19) and which shows changes in SNR (signal-to-noise ratio) of the signal observed by an array sensor and in dispersion of the estimated angle of the object is shown in FIG. 8. This theorem is generally called the CRB.

A coordinate system that an angular direction is plotted on the vertical axis and the SNR value is plotted on the horizontal axis is shown in FIG. 8. The center of the vertical axis which indicates the angular direction is set to zero degree and the angle is increased in upper and lower, that is, plus and minus directions. It is indicated that the zero-degree angle at the center is a correct azimuth angle, and a larger error occurs in the azimuth angle as it goes away from the zero-degree angle in the upper and lower directions. In addition, the horizontal axis which indicates the SNR value indicates that the SNR value is increased from the left to the right. That is, the horizontal axis indicates that the SNR value becomes lower and the intensity of the observed signal becomes lower as they go toward the left side of the horizontal axis and the SNR value becomes higher and the intensity of the observed signal becomes higher as they go toward the right side of the horizontal axis.

Further, in FIG. 8, a state where the observation data has been plotted on the above-mentioned coordinate system is shown. The observation data is plotted on the coordinates system shown in FIG. 8 in the form of "✶" in accordance with what degree of intensity (the SNR value) the observation data has and which angular direction (the azimuth angle) the observation data indicates. That is, each "✶" plotted in FIG. 8 indicates each result of observation and specifically, pieces of the observation data which are −12, −9, −6, −3, 0, 3, and 6 in SNR value (dB) are plotted respectively 100 by 100.

As understood by referring to FIG. 8, the signal which is higher in SNR value becomes narrower in distribution width of the angular direction and the estimated angle φ thereof comes into a state where it distributes at the correct angle (the zero-degree angle) with no dispersion. In addition, the signal which is lower in SNR value becomes wider in distribution width of the angular direction and the estimated angle φ thereof comes into a state where it is dispersed apart from the correct angle (the zero-degree angle). That is, this indicates that the lower the SNR value is, the higher the possibility that the object is present at a place which deviates from the estimated angle φ becomes. Distribution curves which clearly indicate the states of dispersion are schematically shown in FIG. 8 in relation to a case where the SNR value (dB) is −6 (a state where the distribution width is wide) and a case where the SNR value (dB) is 0 (a state where the distribution width is narrow).

It is seen that there are many cases where the observation which is lower in intensity stochastically exhibits an angle which more deviates from the original azimuth angle (the correct azimuth angle) in the plus or minus direction in this way. This fact indicates that for the observation data of one pixel j in the observation data space, the number of the grids i influenced by the observation data of that pixel j is not limited to one and the lower the intensity is, the more the range of intensity is broadened the left and right directions (the circumferential direction of the azimuth angle φ) and the more the distribution width is increased accordingly. This state is shown in FIG. 9A.

FIG. 9A is a diagram illustrating one example of the state of dispersion which has been described with reference to FIG. 8, by mutually superposing the horizontal axis indicating the angular direction and the arrangement of the grids which are arranged in the angular direction. FIG. 9A shows that the probability of presence of objects is broadened centering on an azimuth angle $\phi_{center}$ (corresponding to the zero-degree angle in FIG. 8) which has been estimated from the phase difference between the reception antennas 120. In addition, FIG. 9A shows that the probability of presence of objects is broadened across the plurality of grids i by gradation. It is shown that the denser the gradation is, the higher the probability of presence of objects is. The probability of presence of objects is not 0% even in the grid i which is located at a position apart from the azimuth angle $\phi_{center}$ because the probability of presence of objects is broadened in this way.

In addition, FIG. 9B schematically shows a state where the pixel j in the observation data space is mapped across the plurality of grids i in the physical space by taking that the probability of presence of objects is broadened into consideration. In the right side of FIG. 9B, it is shown that the probability of presence of objects is broadened centering on the azimuth angle $\phi_{center}$ which has been estimated from the phase difference between the reception antennas 120. In addition, the state where the probability of presence of objects is broadened across the plurality of grids i is shown by the gradation.

In calculation of the weight in step S211, the azimuth angle $\phi_{center}$ is calculated from the phase difference between the reception antennas 120 for the pixel j which has been sampled and the distribution function which indicates how the probability of presence of object is broadened as it goes away in the left and right directions centering on the azimuth angle $\phi_{center}$ from the intensity of the pixel j by using the CRB on the basis of the above-mentioned knowledge. Further, a function $W(\phi_{i,j})$ that the distribution function obtained in this way has been normalized is calculated. As described later, the function $W(\phi_{i,j})$ is called a weight $W(\phi_{i,j})$ because it is used as the weight for the logarithm-likelihood ratio.

Next, the calculation performed in step S213 (calculation processing performed by the occupancy grid map calculation unit 107) will be described. As described above, the weight $W(\phi_{i,j})$ is the normalized distribution function which indicates that the lower the intensity of the pixel j concerned is, the more the range of intensity is broadened in the left and right directions (the circumferential direction of the azimuth angle φ) and the more the distribution width is increased accordingly. The concept of dispersion expressed by this weight $W(\phi_{i,j})$ is applied to the grid-unspecified logarithm-likelihood ratio which is expressed by the formula (4), further, the concept of the existing updating formulae (see the formula (1) to the formula (3)) for adding the updated values obtained by observation is extended and an updating formula which is expressed by the following formula (5) is defined.

[Numerical Formula 5]

$$\log\frac{p(m_i|z_1,\ldots,z_j)}{1-p(m_i|z_1,\ldots,z_j)} = w(\Phi_{i,j}) \times \log\frac{p(m|z_j)}{1-p(m|z_j)} + \log\frac{1-p(m_i)}{p(m_i)} + \log\frac{p(m_i|z_1,\ldots,z_{j-1})}{1-p(m_i|z_1,\ldots,z_{j-1})} \quad (5)$$

In regard to the pixel j which has been sampled, the formula (5) is applied to all groups of the grids each having the distance r which is equal to those of the grids in the physical space which correspond to the pixel j. In the formula (5), that the weight $W(\phi_{i,j})$ indicates the dispersion of the grids i in the left and right directions (the circumferential direction) is taken into consideration.

The left side of the formula (5) is the logarithm odds of the occupation probability $p(m_i|z_1, \ldots, z_j)$ which has been obtained up to the pixel j in the grid i. On the other hand, the right-side third term of the formula (5) is the logarithm odds of an occupation probability $p(m_i|z_1, \ldots, z_{j-1})$ which has been obtained up to the pixel j−1 and a value of a result of calculation (the left side of the formula (5) which has been obtained by the last preceding calculation) obtained by the last preceding calculation is substituted into this right-side third term.

That is, for example, in the processing shown in FIG. 6, when the calculation processing is performed by sequentially sampling the pixels from within the observation data space, processing of storing the result of calculation of the formula (5) for the pixel which has been sampled last previously (for example, the pixel j−1) and then substituting the result of calculation into the right-side third term of the formula (5) for the pixel to be sampled next (for example, the pixel j) is performed.

The right-side second term of the formula (5) has an initial value which is optionally set and, for example, when $p(m_i)$ =0.5, the right-side second term is set to zero. Accordingly, when the formula (5) is most simplified by setting the right-side second term to zero, the formula (5) is expressed as the sum total of the right-side first term of the formula (5).

The right-side first term of the formula (5) is the term which expresses the feature of the present invention and the term that the grid unspecified logarithm-likelihood has been multiplied by the weight $W(\phi_{i,j})$ which is different depending on the grid i. It may be also said that this weight $W(\phi_{i,j})$ is the density of the distribution which indicates dispersion which is schematically shown in FIG. 9A and the right side of FIG. 9B relative to the angle ϕ concerned.

That it is allowable to think of the product that the density of the distribution is weighted relative to the logarithm-likelihood ratio obtained from the observation data is derived from the comparison with the related art formula (3) as follows. That is, attention is paid to the situation that the distribution in FIG. 8 is expressed with the frequency that each observation ("✻" in FIG. 8) has been performed a plurality of times. Here, it is thought that the influence of the pixel j concerned in the observation data space is imparted to the plurality of grids with the distribution of the weight $W(\phi_{i,j})$, as expressed in the formula (3) as a lot of K times observations "✻". In the pixel j concerned, the value to which addition has been made by the amount corresponding to the number of observations "✻" which is proportional to the weight $W(\phi_{i,j})$ indicates the value for updating for the grid i concerned. Finally, to normalize the entire by regarding K as an infinite number is equal to multiply the grid unspecified logarithm-likelihood ratio (the formula (4)) by the weight $W(\phi_{i,j})$.

By the above-mentioned method, it is possible to reflect the observation data sensed by the sensor 50 on the occupancy grids and to prepare the occupancy grid map by sampling the value of each pixel in the observation data space and sequentially updating the occupation probability of the plurality of grids in the physical space.

Figure 10A:
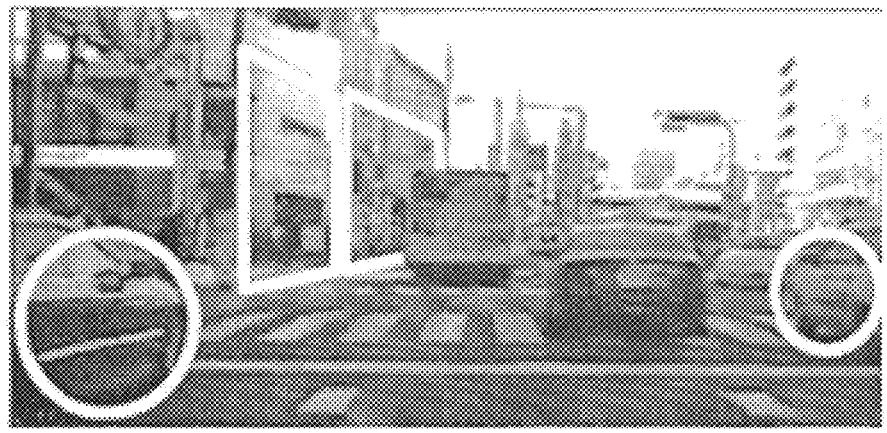
FIG. 10A is a diagram illustrating one example of a scene obtained when looking forward from a vehicle with a sensor being loaded.
Figure 10B:
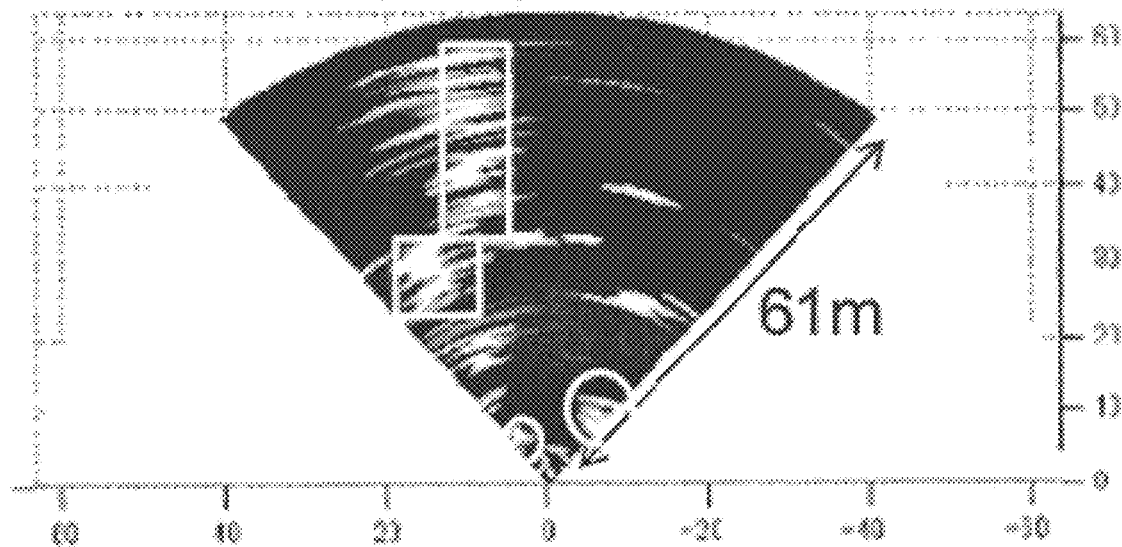
FIG. 10B is a diagram illustrating one example of an occupancy grid map prepared by extracting only stationary objects from the observation data sensed by the sensor in the scene in FIG. 10A.
Figure 11A:
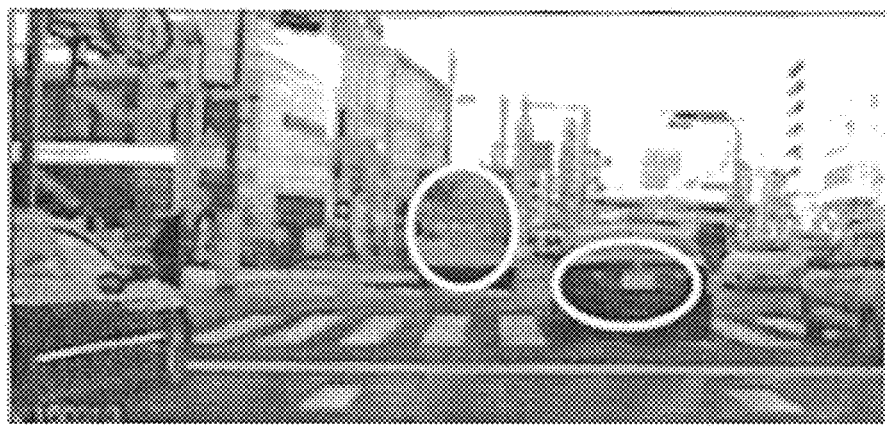
FIG. 11A is a diagram illustrating another example of the scene obtained when looking forward from the vehicle with the sensor being loaded.
Figure 11B:
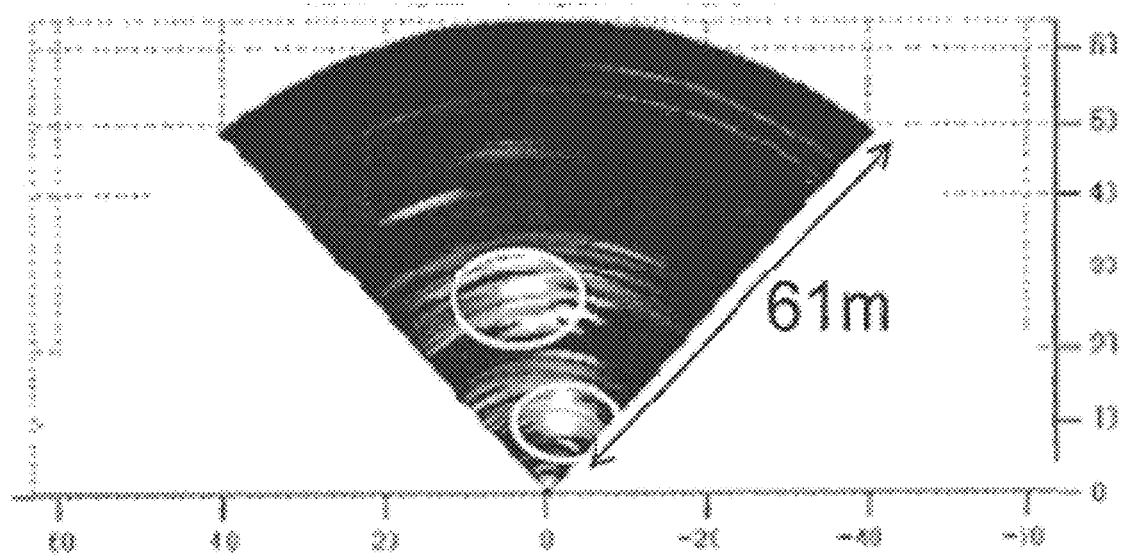
FIG. 11B is a diagram illustrating another example of the occupancy grid map prepared by extracting only moving objects from the observation data sensed by the sensor in the scene in FIG. 11A.

In addition, FIG. 10A and FIG. 10B, and FIG. 11A and FIG. 11B each shows one example that the occupancy grid map has been actually prepared by using the above-mentioned method. FIG. 10A and FIG. 11A each shows one example of a scene obtained by observing the front from the vehicle on which the sensor 50 is loaded. FIG. 10B and FIG. 11B each shows one example of the occupancy grid map which has been prepared from the observation data sensed by the sensor 50 in this occasion.

FIG. 10B shows one example of a result of calculation performed targeting on a reflection point which may be regarded to be stationary and buildings and standing vehicles which are photographed in FIG. 10A are sensed with accuracy. In addition, FIG. 11B shows one example of a result of calculation performed targeting on a reflection point which may be regarded to be moving and preceding vehicles which are photographed in FIG. 11A are sensed with accuracy.

As described above, according to the first embodiment of the present invention, a novel sensor model which is based on the probability variable is proposed. It is possible to prepare the occupancy grid map by calculating the occupation probability (the grid-unspecified logarithm-likelihood ratio) in accordance with the magnitude of the intensity of each pixel obtained from the observation data and by taking that the influence is imparted on the plurality of grids with the width (the distribution function) of dispersion different in accordance with the magnitude of the intensity into consideration.

Second Embodiment

Next, the second embodiment of the present invention will be described. In the above-mentioned first embodiment of the present invention, in regard to the pixel j concerned in the observation data space, the gird-unspecified logarithm-likelihood ratio is calculated on the basis of the intensity sampled from that pixel j and calculation that addition is performed by multiplying the logarithm-likelihood ratio by the weight is performed on the plurality of grids (the grids which are equal to the pixel j in distance measured from the observation point) of the distances which correspond to the distance of the pixel j. This calculation is expressed by the formula (5) relating to the grid i and this calculation is performed in regard to all of the pixels j. That is, the value included in one pixel j imparts influence on the occupation probability of the plurality of grids i.

When viewing the above-mentioned situation from the grid side conversely, it may be said that the values included in the plurality of pixels j are added together for the grid i concerned. However, in reality, there is no such a situation that the objects are present in a superposed state in the superposed grids i of the same kind, judging from the observation data of the plurality of pixels j. Therefore, a way of thinking that only the value which is the highest in probability in information derived from the plurality of pixels j is added for the grid i concerned is also possible. The following formula (6) reflects this way of thinking.

[Numerical Formula 6]

$$\log\frac{p(m_i \mid z_1, \ldots, z_j)}{1 - p(m_i \mid z_1, \ldots, z_j)} = \max_{k=1,\ldots,j}\left(w(\Phi_{i,j}) \times \log\frac{p(m \mid z_k)}{1 - p(m \mid z_k)}\right) + \log\frac{1 - p(m_i)}{p(m_i)} \quad (6)$$

"max" described in the right-side first term of the above-mentioned formula (6) is a max operator for adopting only the maximum value in numerical values (k=1, . . . , j) in an array. The max operator in the right-side first term indicates to adopt the maximum value in the values of the product of the grid-unspecified logarithm-likelihood ratio and the weight $W(\phi_{i,j})$ and only the value which is maximum in the values of the product of the grid-unspecified logarithm-likelihood ratio and the weight $W(\phi_{i,j})$ is finally adopted as the value which indicates the occupation probability off the grid i concerned.

Figure 12A:
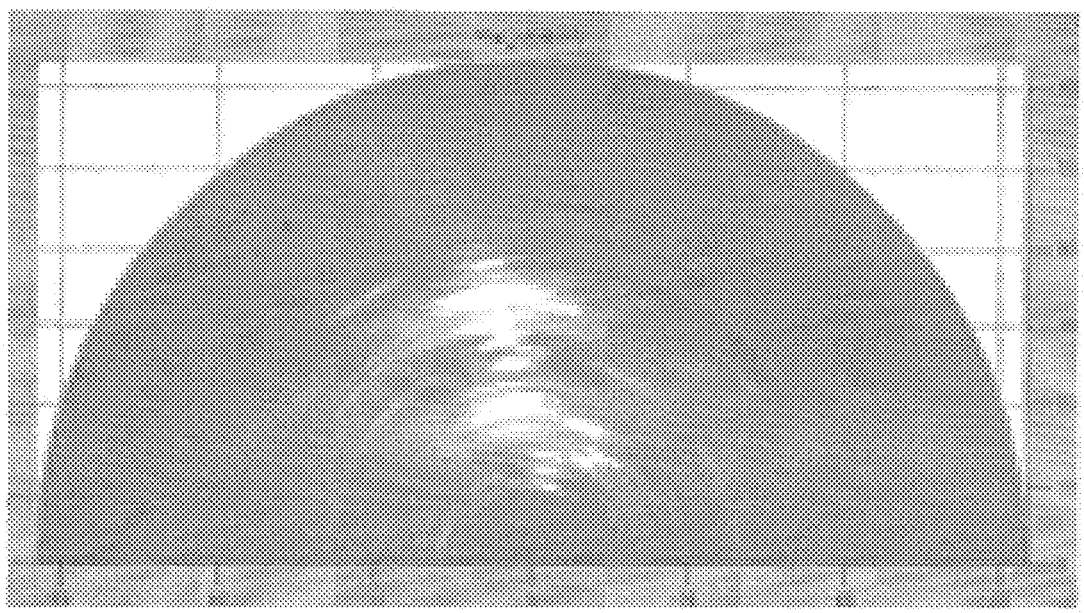
FIG. 12A is a diagram illustrating one example that the occupancy grid map has been actually prepared by using a method according to the first embodiment of the present invention.
Figure 12B:
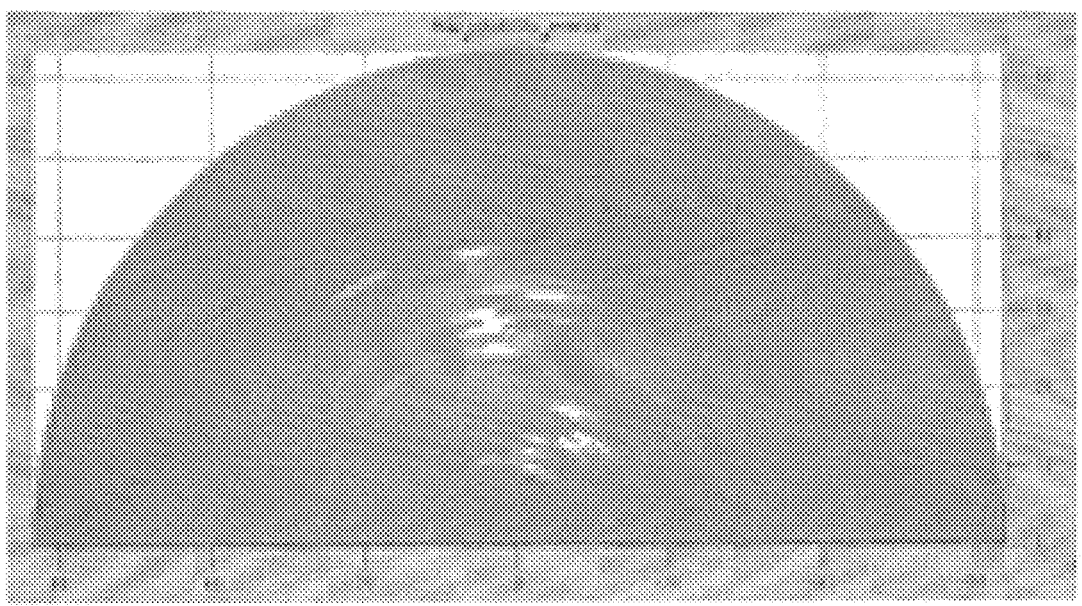
FIG. 12B is a diagram illustrating one example that the occupancy grid map has been actually prepared by using a method according to a second embodiment of the present invention.

In addition, one example that the occupancy grid map has been actually prepared by using the above-mentioned method is shown in each of FIG. 12A and FIG. 12B. The occupancy grid map prepared by performing the calculation in the first embodiment of the present invention is shown in FIG. 12A as a comparative example. The occupancy grid map prepared by performing the calculation in the second embodiment of the present invention is shown in FIG. 12B. While the result that the position where no object is present in reality is in the occupied state m is obtained in the example in FIG. 12A, the result that the position is not in the occupied state m is obtained in the example in FIG. 12B.

The first and second embodiments of the present invention are basically the same as each other except that while the formula (5) is used for calculation by the occupancy grid map calculation unit 107 in the first embodiment of the present invention, the formula (6) is used in the second embodiment of the present invention. That is, the configuration of the surrounding environment estimation device 10 according to the second embodiment of the present invention is basically the same as the configuration shown in FIG. 2 and the second embodiment is different from the first embodiment only in the numerical formula used by the occupancy grid map calculation unit 107 and the calculation processing performed by the occupancy grid map calculation unit 107. In addition, the processing performed by the surrounding environment estimation device 10 according to the second embodiment of the present invention is basically the same as the processing shown in FIG. 6 but the second embodiment is different from the first embodiment only in the numerical formula used in step S213 and the calculation processing performed in step S213.

As described above, according to the second embodiment of the present invention, similarly to the first embodiment of the present invention, a novel sensor model which is based on the probability variable is proposed. It is possible to prepare the occupancy grid map by calculating the occupation probability (the grid-unspecified logarithm-likelihood ratio) in accordance with the magnitude of the intensity of each pixel obtained from the observation data and by taking that the influence is imparted to the plurality of grids with the width (the distribution function) of dispersion different in accordance with the magnitude of the intensity into consideration.

Third Embodiment

Next, the third embodiment of the present invention will be described. In the methods according to the above-mentioned first and second embodiments of the present invention, the presence probability of each of the stationary object and the moving object is calculated and the occupancy grid map is prepared as shown in each of FIG. 10B, FIG. 11B, FIG. 12A and FIG. 12B. In this case, it is possible to update the occupation probability of the object on the occupancy grid map by performing additions as expressed in the formula (5) and the formula (6).

It is also possible to prepare the occupancy grid map by sorting the object which is moving and the object which is not moving and by extracting only the object which is not moving, for example, as shown in FIG. 10B. Alternatively, it is also possible to prepare the occupancy grid map by extracting only the object which is moving, for example, as shown in FIG. 11B.

Here, a case where it is wished to prepare an occupancy grid map that a guard rail and a wall on a road have been sensed as positions which are in the occupied states m and a road part where vehicles are allowed to travel is sensed as a position which is not in the occupied state m from the observation data sensed by using the sensor 50 loaded on the vehicle is supposed. In this case, for example, as shown in FIG. 10A, it is possible to prepare the road part from which the object which is moving has been excluded by sorting only the object which is not moving.

However, it is also possible to think that also the position where the object which is moving such as a preceding vehicle has been sensed is the convincing evidence which indicates that the position is within an area (the road part) where the vehicle is allowed to travel, without excluding the object which is moving. That is, it is possible to regard even a position where a moving preceding vehicle occupies at a moment of observation concerned as the evidence that the position is the road part where the vehicle is allowed to travel because the moving preceding vehicle is travelling and is present at that position at the above-mentioned moment.

In the third embodiment of the present invention, the position where the moving object is present is regarded as the evidence that it is the "unoccupied" position in the meaning that it is the road part as described above. The following formula (7) and formula (8) for performing calculations so as to reduce the occupation probability of the position where the moving object is present are defined by extending the above-mentioned formula (5) and formula (6).

[Numerical Formula 7]

$$\log\frac{p(m_i \mid z_1, \ldots, z_j)}{1 - p(m_i \mid z_1, \ldots, z_j)} = \text{sgn}(j) \times w(\Phi_{i,j}) \times \log\frac{p(m \mid z_j)}{1 - p(m \mid z_j)} + \quad (7)$$

$$\log\frac{1 - p(m_i)}{p(m_i)} + \log\frac{p(m_i \mid z_1, \ldots, z_{j-1})}{1 - p(m_i \mid z_1, \ldots, z_{j-1})}$$

[Numerical Formula 8]

$$\log\frac{p(m_i \mid z_1, \ldots, z_j)}{1 - p(m_i \mid z_1, \ldots, z_j)} = \quad (8)$$

$$\text{sgn}(j) \times \max_{k=1,\ldots,j}(w(\Phi_{i,j}) \times \log\frac{p(m \mid z_k)}{1 - p(m \mid z_k)} + \log\frac{1 - p(m_i)}{p(m_i)}$$

The formula (7) is obtained by extending the above-mentioned formula (5) and the formula (8) is obtained by extending the above-mentioned formula (6). Both of the formula (7) and the formula (8) are configured by further multiplying the observation terms (the right-side first terms) in the formula (5) and the formula (6) respectively by "sgn(j)". "sgn(j)" is a sign function that the pixel j is set to "1" for the stationary object and is set to "−1" for the moving object. Incidentally, it is possible to discriminate whether the observation data included in the pixel j corresponds to the stationary object or the moving object by referring to the value of the relative velocity (the value plotted on the horizontal axis of the observation data space in the left side of FIG. 4) which is obtained from the pixel j. In addition, although, here, each of the observation terms (the right-side first terms) of the formula (7) and the formula (8) is simply multiplied by the sign function "sgn(j)" which takes "1" or "−1", the sign function "sgn(j)" may be replaced with a function depending on the velocity of the object (for example, the function that the lower the velocity of the object is, the closer the value approaches "1" and the higher the velocity of the object is, the closer the value approaches "−1").

In the formula (7) and the formula (8), the observation term (the right-side first term) is set to a negative value with the product of the sign function sgn(j)="−1" for the moving object. That is, when the moving object is present, calculation for updating is performed so as to reduce the probability that the position concerned is in the occupied state (that is, to increase the probability that the position is not in the occupied state) by not adding but subtracting the observation term (the right-side first term).

Figure 13:
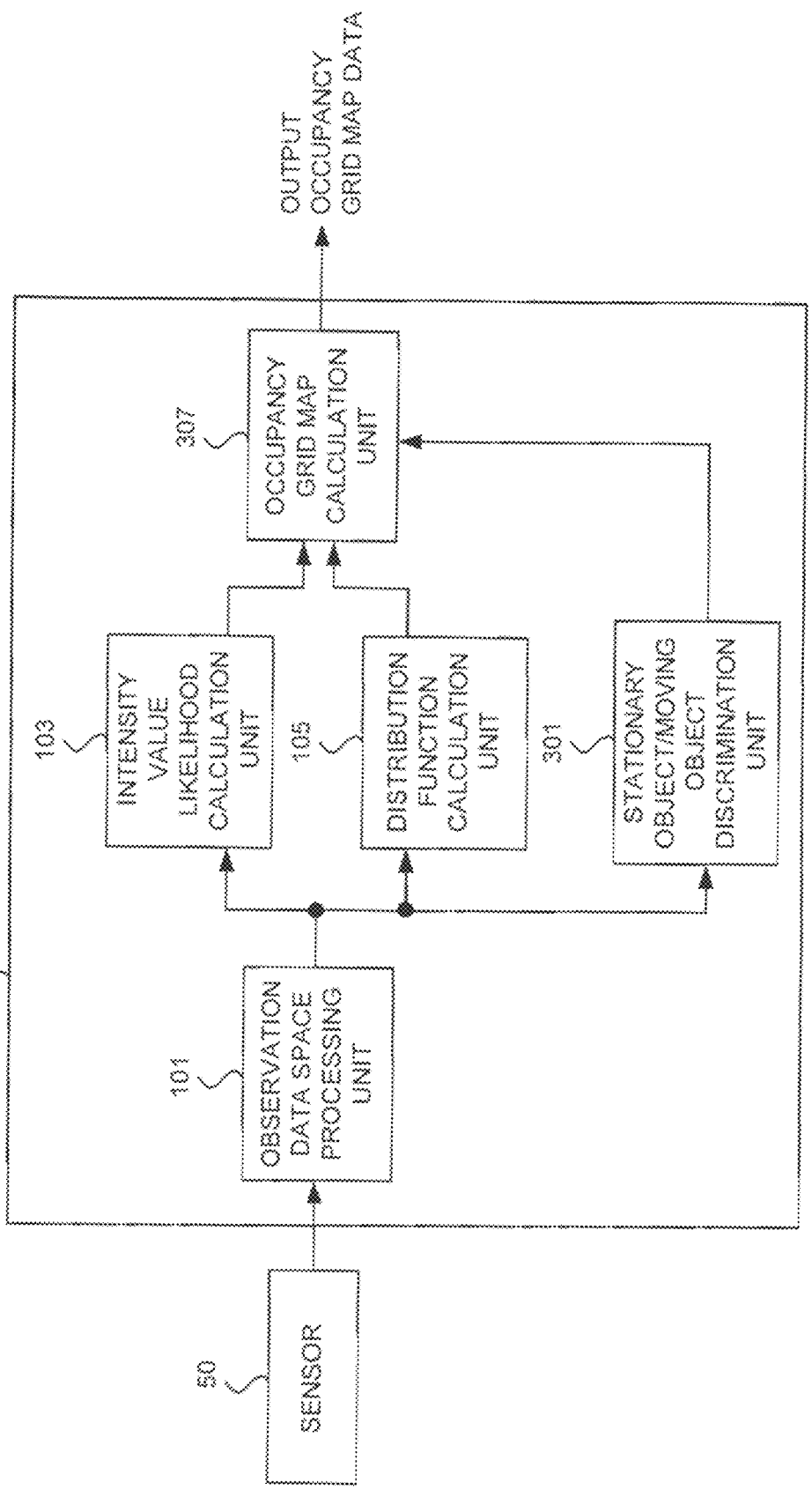
FIG. 13 is a diagram illustrating one example of a configuration of a surrounding environment estimation device according to a third embodiment of the present invention.

In the following, one example of a configuration of a surrounding environment estimation device according to the third embodiment of the present invention will be described with reference to FIG. 13. FIG. 13 shows one example of the configuration of the surrounding environment estimation device according to the third embodiment of the present invention. The surrounding environment estimation device 30 shown in FIG. 13 includes a stationary object/moving object discrimination unit 301 in addition to the constitutional elements shown in FIG. 2. The configurations of the observation data space processing unit 101, the intensity value likelihood calculation unit 103, and the distribution function calculation unit 105 are the same as those in FIG. 2 and therefore description thereof is omitted here.

The stationary object/moving object discrimination unit 301 has a function of acquiring the relative velocity (the Doppler velocity) relating to a specific pixel which is present in the observation data space and discriminating whether the object which is present in the specific pixel is a stationary object or a moving object from the relative velocity so acquired. A result of discrimination performed by the stationary object/moving object discrimination unit 301 is supplied to an occupancy grid map calculation unit 307.

In addition, the occupancy grid map calculation unit 307 has a function of receiving the result of discrimination which is supplied from the stationary object/moving object discrimination unit 301 and also a function of performing calculations expressed by the formula (7) and the formula (8) by using information on the discrimination result, in comparison with the occupancy grid map calculation unit 107 shown in FIG. 2. The occupancy grid map calculation unit 307 determines the value of the sign function sgn(j) included in the observation term (the right-side first term) in, for example, each of the formula (7) and the formula (8) and then performs calculations on the basis of the discrimination result which has been supplied from the stationary object/moving object discrimination unit 301.

Although the processing performed by the surrounding environment estimation device 30 according to the third embodiment of the present invention is basically the same as the processing shown in FIG. 6, the surrounding environment estimation device 30 is different from the surrounding environment estimation unit 10 in that the process of discriminating whether the object concerned is the stationary object or the moving object is performed by the stationary object/moving object discrimination unit 301 and the numerical formula and the calculation processing used in steps corresponding to step S213 are different from those in step S213 in FIG. 6.

Figure 14:
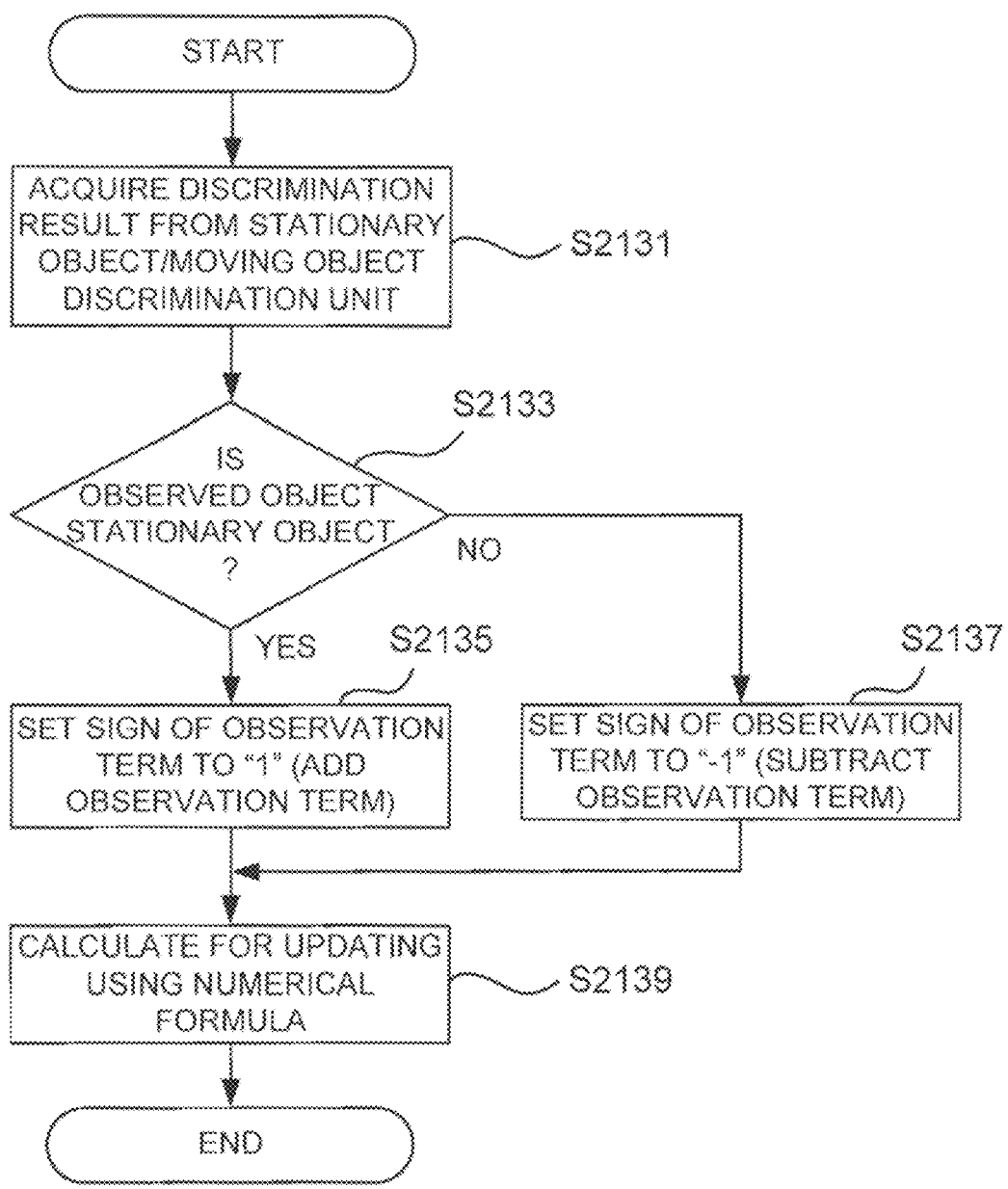
FIG. 14 is a flowchart illustrating one example of characteristic processing according to the third embodiment of the present invention.

In the following, processing which is characteristic to the third embodiment of the present invention will be described with reference to FIG. 14. FIG. 14 is a flowchart illustrating one example of the processing which is characteristic to the third embodiment of the present invention. The processing (the processing performed by the occupancy grid map calculation unit 307) in FIG. 14 corresponds to the process performed in step S213 in FIG. 6.

In FIG. 14, the occupancy grid map calculation unit 307 acquires the discrimination result from the stationary object/moving object discrimination unit 301 (step S2131) and decides whether the observed object (the object included in the pixel j to be processed) is a stationary object or a moving object from the discrimination result (step S2133).

When the observed object is the stationary object, the occupancy grid map calculation unit 307 sets the value of the sign function sgn(j) included in the observation term (the right-side first term) in the formula (7) or the formula (8) to "1" (step S2135). On the other hand, when the observed object is the moving object, the occupancy grid map calculation unit 307 sets the value of the sign function sgn(j) included in the observation term (the right-side first term) in the formula (7) or the formula (8) to "−1" (step S2137). Then, the occupancy grid map calculation unit 307 performs calculations for updating on the plurality of grids using the formula (7) or the formula (8), by utilizing the result (the logarithm-likelihood ratio) of calculation performed by the intensity value likelihood calculation unit 103 and the result (the weight) of calculation performed by the distribution function calculation unit 105 (step S2139).

As described above, according to the third embodiment of the present invention, a novel sensor model which is based on the probability variable is proposed similarly to the first and second embodiments of the present invention. It is possible to prepare the occupancy grid map by calculating the occupation probability (the grid-unspecified logarithm-likelihood ratio) in accordance with the magnitude of the intensity of the pixel obtained from the observation data and by taking that the influence is imparted to the plurality of grids with the width (the distribution function) of dispersion different in accordance with the magnitude of the intensity into consideration. Further, according to the third embodiment of the present invention, it is possible to prepare the occupancy grid map which is higher in accuracy by performing calculations such that the position where the moving object is present is decided to be in the unoccupied state.

Fourth Embodiment

In the following, the fourth embodiment of the present invention will be described. Although in each of the above-mentioned first to third embodiments, the case where the occupancy grid map is prepared from a snapshot of the observation data at a moment has been described, it is also possible to prepare another occupancy grid map by combining together the above-mentioned occupancy grid maps. In the following, the occupancy grid map prepared from the snapshot of the observation data at a moment will be called a local occupancy grid map and the occupancy grid map whose coordinate system has been converted for the purpose of superposing together the plurality of local occupancy grid maps will be called a global occupancy grid map.

The global occupancy grid map is expressed by using grids not of a circular polar coordinate system but of a rectangular coordinate system. A value relating to the occupancy probability and the number of times of observation performed on the grid concerned (information indicating how many times the grid has been observed) are stored in each grid.

Figure 15A:
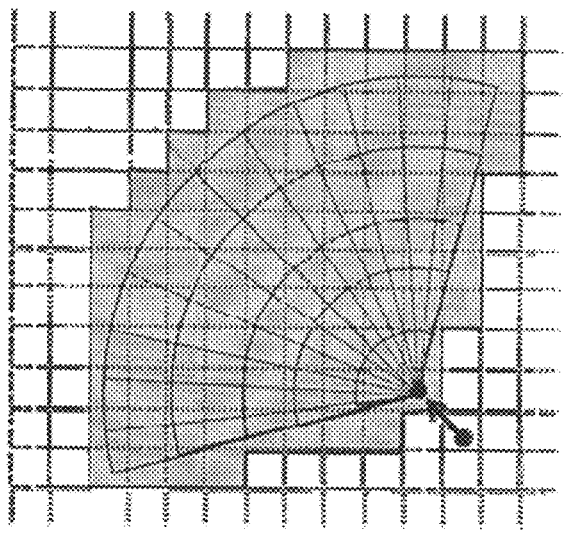
FIG. 15A is a diagram illustrating one example of a local occupancy grid map obtained at a moment according to a fourth embodiment of the present invention.
Figure 15B:
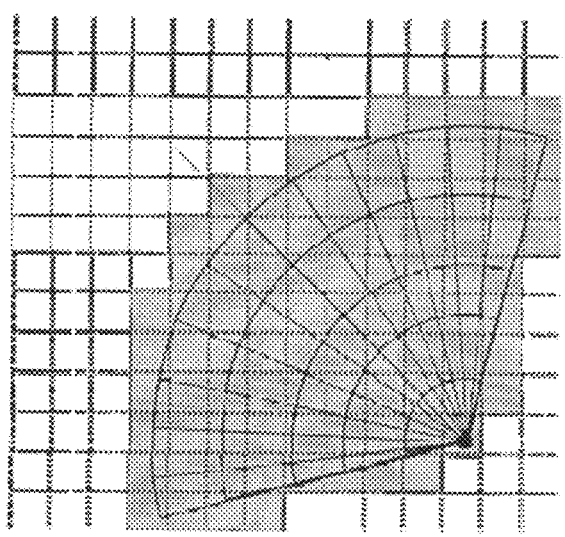
FIG. 15B is a diagram illustrating one example of another local occupancy grid map obtained at another moment according to the fourth embodiment of the present invention.
Figure 15C:
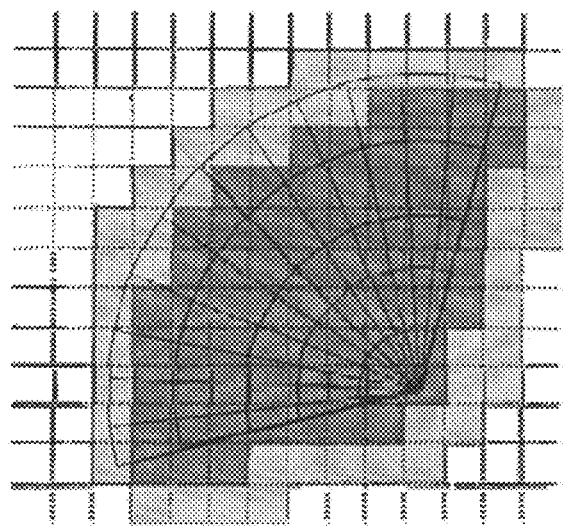
FIG. 15C is a diagram illustrating one example of a global occupancy grid map that the plurality of local occupancy grid maps have been combined together according to the fourth embodiment of the present invention.

In the following, a method of reflecting information included in the local occupancy grid map on the global occupancy grid map will be described with reference to FIG. 15A, FIG. 15B and FIG. 15C.

The value of the occupation probability which is based on the observation data obtained from the sensor 50 is stored in each grid (the circular polar coordinate system) of the local occupancy grid map. When information included in the local occupancy grid map is to be reflected on the global occupancy grid map (the rectangular coordinate system), the local and global occupancy grid maps are different from each other in the coordinate system of the grids and therefore it may be necessary to interpolate between the grids thereof. Specifically, to which position in the local occupancy grid map of the circular polar coordinate system the position of the central coordinates of each grid in the global occupancy grid map corresponds is calculated, how much the corresponding position deviates along an r-axis and a φ-axis up to each of the surrounding grids of the circular polar coordinate system is obtained and a value for interpolation depending on the value of each surrounding grid which has been weighted in accordance with the degree of deviation so obtained is set as the value of each grid in the global occupancy grid map.

In the following, a method of preparing the global occupancy grid map by combining together the plurality of local occupancy grid maps will be described. By way of example, a local occupancy grid map (FIG. 15B) obtained at a moment and a local occupancy grid map (FIG. 15A) obtained at the next moment after an observer has moved are shown on the global occupancy grid map. In addition, a state where the respective local occupancy grid maps in FIG. 15A and FIG. 15B have been mutually superposed is shown in FIG. 15C.

The value of each grid in the global occupancy grid map is calculated by combining together these two time frames and adding the value (as described above, the value which has been interpolated so as to match the rectangular coordinate system) relating to the occupation probability in each of the plurality of local occupancy grid maps. In addition, since the number of times that the values of the local occupancy grid map have been added together, that is, the number of times that each grid has been observed is different depending on each grid, the number of times that each grid has been observed is recorded in each grid. By doing so, when a probability map is to be finally displayed on the basis of the global occupancy grid map, it becomes possible to calculate an "average value" of the values relating to the occupation probability by dividing the sum of the values relating to the occupation probability of each grid by the number of times that each grid has been observed. Then, it becomes possible to display this average value as the final value of the occupation probability.

Figure 16:
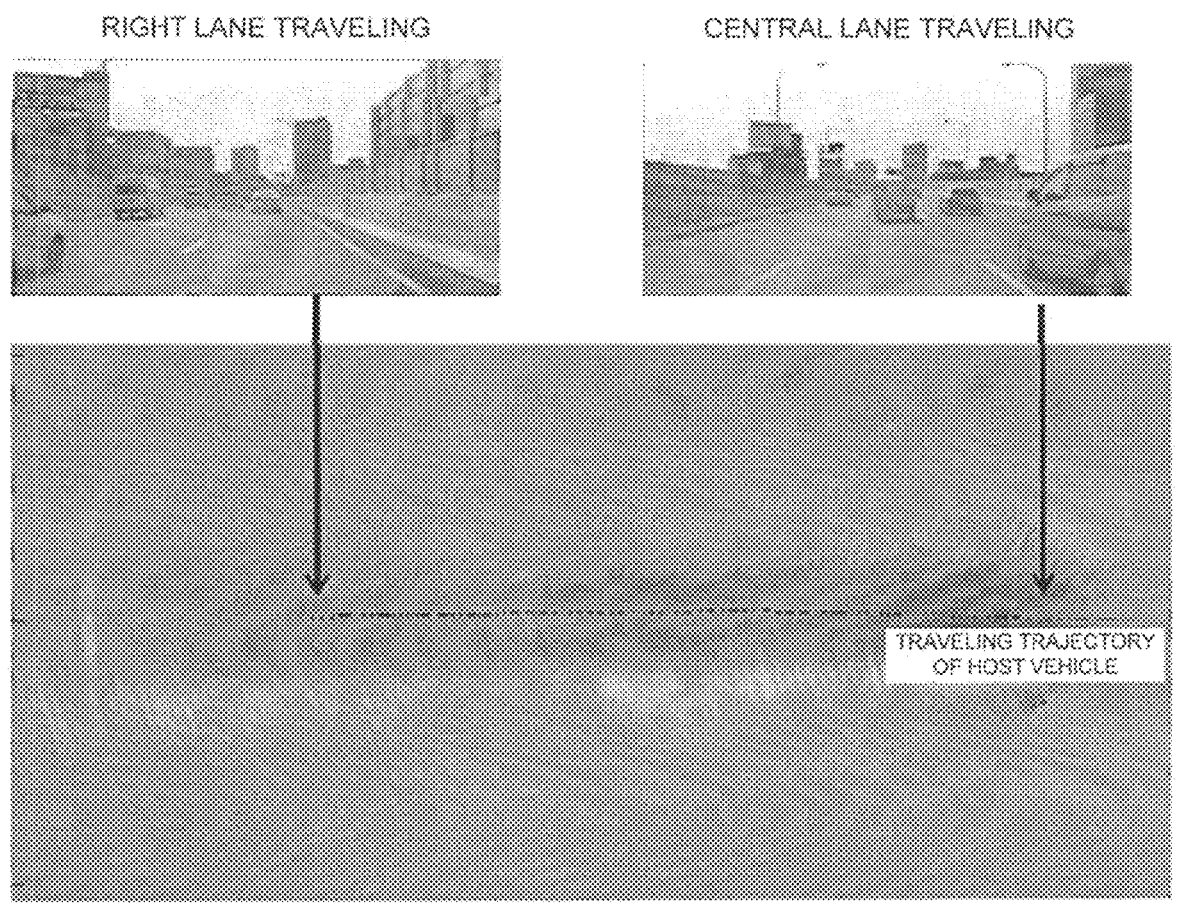
FIG. 16 is a diagram illustrating one example of the global occupancy grid map actually prepared on the basis of a method according to the fourth embodiment of the present invention.

One example of the global occupancy grid map prepared by the above-mentioned method is shown in FIG. 16. In the global occupancy grid map shown in FIG. 16, the occupation probability having values from "0" to "1" is included in each grid. The closer the occupation probability is to "1" indicating the occupied state, the whiter the grid is displayed and the closer the occupation probability is to "0" indicating the unoccupied state, the blacker the grid is displayed.

The global occupancy grid map shown in FIG. 16 is prepared by using the formula (8) on the basis of the method according to the above-mentioned third embodiment of the present invention. The global occupancy grid map shown in FIG. 16 indicates that it is possible to prepare the global occupancy grid map by combining together the plurality of local occupancy grid maps and it is possible to obtain the beneficial result from the method according to the third embodiment of the present invention.

In the third embodiment of the present invention, the stationary object such as the wall on the road is regarded as an occupied area and an area of the road part where the vehicle is allowed to travel is regarded as an unoccupied area. The positions where the stationary objects such as noise barriers on the both sides of the road have been sensed are displayed white as the occupied areas in FIG. 16 as a result of addition of the sign function sgn(j) in the form of the positive sign "1" by using the formula (8). On the other hand, the position where the preceding vehicle has been sensed is displayed black in FIG. 16 as the unoccupied area as a result of addition of the sign function sgn(j) in the form of the negative sign "−1" (that is, it becomes a division term). In this way, since the area of the road part where the vehicle is allowed to travel is precisely decided as the unoccupied area by the method according to the third embodiment of the present invention and is displayed black as shown in FIG. 16, the contrast between the occupied area and the unoccupied area is more clarified and it is easier to estimate the area where the vehicle is allowed to travel, that is, a free space.

As described above, according to the fourth embodiment of the present invention, it becomes possible to prepare the global occupancy grid map by combining together the plurality of local occupancy grid maps. Further, for example, when the global occupancy grid map has been prepared by mutually superposing the local occupancy grid maps which are obtained from the result of calculation (the result of calculation according to the third embodiment of the present invention) that the position where the moving object is present has been decided as the unoccupied area, the contrast between the occupied area and the unoccupied area is more clearly displayed.

In each of the embodiments of the present invention, the block diagram used for description of the configuration of the device merely shows the functions relating to the present invention. In actual implementation, the functions may be implemented by hardware, software, firmware and/or an optional combination thereof. The function which is implemented by software may be stored into an optional computer-readable medium (a memory) as one command or the plurality of commands and/or one code or the plurality of codes and these commands and/or codes may be executed by a hardware-based processing unit such as a CPU (Central Processing Unit) or an ECU (Engine Control Unit). In addition, the functions relating to the present invention may be implemented by various devices including an IC (Integrated Circuit), an IC chip set and so forth.

In addition, in each of the embodiments of the present invention, the flowchart used for description of the processing merely shows one example of each process for realizing the present invention and does not limit the processes for realizing the basic concept of the present invention. In addition, the flow of each process in the flowchart does not limit the order that the respective processes are executed, the order of processes to be executed may be appropriately changed, the processes may be performed in parallel appropriately, and omission of one process or processes and addition of one process or processes may be made.

Further, in regard to the contents disclosed in the present specification, optional contents may be appropriately combined together even when it is the combination of contents which is not clearly described. Further, the contents disclosed in the present specification may be appropriately combined with the contents of related art which has been already well known similarly. Such combinations are also included in part of the limits of disclosure of the present invention.

INDUSTRIAL APPLICABILITY

The present invention is applicable to the technique of estimating the surrounding environment from the observation data obtained by sensing the surroundings by using the sensing equipment (the sensor). In particular, the present invention is applicable to the technique of estimating the environment around the vehicle from the observation data obtained by using the sensing equipment which is loaded on the vehicle.

What is claimed is:

1. A surrounding environment estimation device for estimating the presence of an object in a surrounding space from observation data obtained by using sensing equipment, the sensing equipment including a transmitter configured to transmit a sensing signal and a receiver configured to receive the sensing signal reflected and returning to the sensing equipment, the surrounding environment estimation device includes a hardware-based processing unit that comprises:

an intensity value likelihood calculation unit that calculates an intensity value of the sensing signal received by the receiver on the basis of the observation data and that calculates a likelihood indicating whether or not the sensing signal received by the receiver is a signal reflected from a detected object on the basis of the intensity value;

a distribution function calculation unit that calculates an azimuth angle of the detected object on the basis of the observation data and that calculates a distribution function of an angle indicating the degree of dispersion centering on the azimuth angle on the basis of the intensity value; and an occupancy grid map calculation unit that performs calculations for updating an occupation probability of the object in each grid of a plurality of grids in an occupancy grid map by using a value obtained by dispersing the likelihood using the distribution function, the occupancy grid map including the plurality of grids by partitioning the surrounding space, and the occupancy grid map describing the occupation probability of the object in each grid of the plurality of grids, wherein the surrounding environment estimation device is configured to prepare the occupancy grid map based on a plurality of pieces of observation data by performing the calculation by the intensity value likelihood calculation unit, the calculation by the distribution function calculation unit and the calculation by the occupancy grid map calculation unit on the basis of the plurality of pieces of observation data.

2. The surrounding environment estimation device according to claim 1, wherein the occupancy grid map calculation unit is configured to disperse the likelihood using the distribution function along an arrangement of a plurality of grids each having a distance which is equal to a distance relative to the detected object included in the observation data, in the grids in the occupancy grid map.

3. The surrounding environment estimation device according to claim 1, wherein a probability indicating whether the detected object is an object or a noise is set in advance for the intensity value, the intensity value likelihood calculation unit is configured to calculate logarithmic odds of the occupation probability of the object obtained from the probability so set and to set a result of the calculation as the likelihood, and the occupancy grid map calculation unit is configured to update the occupation probability of the object in the plurality of grids in the occupancy grid map by calculating a product of the likelihood and the distribution function.

4. The surrounding environment estimation device according to claim 3, wherein the occupancy grid map calculation unit is configured to prepare the occupancy grid map by calculating the sum total of values of the product of the likelihood and the distribution function which are obtained from each piece of observation data.

5. The surrounding environment estimation device according to claim 3, wherein the occupancy grid map calculation unit is configured to prepare the occupancy grid map by calculating values of the product of the likelihood and the distribution function which are obtained from each piece of observation data and adopting a maximum value in the calculated values of the product.

6. The surrounding environment estimation device according to claim 4, further comprising:

a stationary object/moving object discrimination unit that discriminates whether the detected object is a stationary object or a moving object on the basis of the observation data, wherein the occupancy grid map calculation unit is configured to, when calculating the product of the likelihood and the distribution function, multiply the product of the likelihood and the distribution function by a positive value for the observation data on the basis of which the detected object has been decided to be the stationary object and multiply the product of the likelihood and the distribution function by a negative value for the observation data on the basis of which the detected object has been decided to be the moving object.

7. The surrounding environment estimation device according to claim 5, further comprising:

a stationary object/moving object discrimination unit that discriminates whether the detected object is a stationary object or a moving object on the basis of the observation data, wherein the occupancy grid map calculation unit is configured to, when calculating the product of the likelihood and the distribution function, multiply the product of the likelihood and the distribution function by a positive value for the observation data on the basis of which the detected object has been decided to be the stationary object and multiply the product of the likelihood and the distribution function by a negative value for the observation data on the basis of which the detected object has been decided to be the moving object.

8. The surrounding environment estimation device according to claim 1, the surrounding environment estimation device being configured to prepare an occupancy grid map relating to a global area including a plurality of different and local areas from the plurality of occupancy grid maps, the plurality of occupancy grid maps being prepared in relation to the plurality of different and local areas.

9. A surrounding environment estimating method of estimating the presence of an object in a surrounding space from observation data obtained by using sensing equipment, the sensing equipment including a transmitter configured to transmit a sensing signal and a receiver configured to receive the sensing signal reflected and returning to the sensing equipment, the surrounding environment estimating method comprising:

a intensity value likelihood calculation step of calculating an intensity value of the sensing signal received by the receiver on the basis of the observation data and calculating a likelihood indicating whether or not the sensing signal received by the receiver is a signal reflected from a detected object on the basis of the intensity value;

a distribution function calculation step of calculating an azimuth angle of the detected object on the basis of the observation data and calculating a distribution function of an angle indicating the degree of dispersion centering on the azimuth angle on the basis of the intensity value; and an occupancy grid map calculation step of performing calculations for updating an occupation probability of the object in each grid of a plurality of grids in an occupancy grid map by using a value obtained by dispersing the likelihood using the distribution function, the occupancy grid map including the plurality of grids by partitioning the surrounding space, and the occupancy grid map describing the occupation probability of the object in each grid of the plurality of grids, wherein the occupancy grid map based on a plurality of pieces of observation data is prepared by performing the calculation in the intensity value likelihood calculation step, the calculation in the distribution function calculation step and the calculation in the occupancy grid map calculation step on the basis of the plurality of pieces of observation data.

10. The surrounding environment estimating method according to claim 9, wherein

In the occupancy grid map calculation step, the likelihood is dispersed using the distribution function along an arrangement of a plurality of grids each having a distance which is equal to a distance relative to the detected object included in the observation data in the grids in the occupancy grid map.

11. The surrounding environment estimating method according to claim 9, wherein a probability indicating whether the detected object is an object or a noise is set in advance for the intensity value, in the intensity value likelihood calculation step, logarithmic odds of the occupation probability of the object obtained from the probability so set are calculated and a result of the calculation is set as the likelihood, and in the occupancy grid map calculation step, the occupation probability of the object in the plurality of grids in the occupancy grid map is updated by calculating a product of the likelihood and the distribution function.

12. The surrounding environment estimating method according to claim 11, wherein in the occupancy grid map calculation step, the occupancy grid map is prepared by calculating the sum total of values of the product of the likelihood and the distribution function which are obtained from each piece of observation data.

13. The surrounding environment estimating method according to claim 11, wherein in the occupancy grid map calculation step, the occupancy grid map is prepared by calculating values of the product of the likelihood and distribution function which are obtained from each piece of observation data and adopting a maximum value in the calculated values of the product.

14. The surrounding environment estimating method according to claim 12, further comprising:

the stationary object/moving object discrimination step of discriminating whether the detected object is a stationary object or a moving object on the basis of the observation data, wherein in the occupancy grid map calculation step, when calculating the product of the likelihood and the distribution function, the product of the likelihood and the distribution function is multiplied by a positive value for the observation data on the basis of which the detected object has been decided to be the stationary object and the product of the likelihood and the distribution function is multiplied by a negative value for the observation data on the basis of which the detected object has been decided to be the moving object.

15. The surrounding environment estimating method according to claim 13, further comprising:

the stationary object/moving object discrimination step of discriminating whether the detected object is a stationary object or a moving object on the basis of the observation data, wherein in the occupancy grid map calculation step, when calculating the product of the likelihood and the distribution function, the product of the likelihood and the distribution function is multiplied by a positive value for the observation data on the basis of which the detected object has been decided to be the stationary object and the product of the likelihood and the distribution function is multiplied by a negative value for the observation data on the basis of which the detected object has been decided to be the moving object.

16. The surrounding environment estimating method according to claim 9, wherein, an occupancy grid map relating to a global area including a plurality of different and local areas is prepared from the plurality of occupancy grid maps, the plurality of occupancy grid maps being prepared in relation to the plurality of different and local areas.

* * * * *